United States Patent [19]

Reeds, III

[11] Patent Number: 5,727,064

[45] Date of Patent: Mar. 10, 1998

[54] CRYPTOGRAPHIC SYSTEM FOR WIRELESS COMMUNICATIONS

[75] Inventor: James Alexander Reeds, III, New Providence, N.J.

[73] Assignee: Lucent Technologies Inc., Murray Hill, N.J.

[21] Appl. No.: 498,713

[22] Filed: Jul. 3, 1995

[51] Int. Cl.⁶ .................. H04L 9/00; H04B 1/69
[52] U.S. Cl. .................. 380/49; 380/6; 380/9; 380/43; 380/50; 375/200
[58] Field of Search .................. 375/200–204, 375/206–210; 380/6, 9, 43, 46, 49, 50

[56] References Cited

U.S. PATENT DOCUMENTS

| | | | |
|---|---|---|---|
| 3,239,294 | 3/1966 | Flanders et al. | 340/825.34 |
| 3,515,805 | 6/1970 | Fracassi et al. | |
| 4,930,139 | 5/1990 | Chandler et al. | 375/207 |
| 5,060,265 | 10/1991 | Finkelstein | 380/46 |
| 5,153,919 | 10/1992 | Reeds, III et al. | 380/44 |
| 5,159,634 | 10/1992 | Reeds, III | 380/42 |
| 5,172,414 | 12/1992 | Reeds, III et al. | 380/45 |
| 5,204,902 | 4/1993 | Reeds, III et al. | 380/23 |
| 5,319,712 | 6/1994 | Finkelstein et al. | 380/44 |
| 5,365,585 | 11/1994 | Puhl et al. | 380/9 |
| 5,420,883 | 5/1995 | Swensen et al. | 375/200 |
| 5,452,328 | 9/1995 | Rice | 375/210 |
| 5,539,775 | 7/1996 | Tuttle et al. | 375/200 |

OTHER PUBLICATIONS

"Mobile Station—Base Station Compatibility Standard for Dual—Mode Spread Spectrum Cellular System", PN-3421 (to be published as IS-95a), Dec. 1994, pp. 6-1 through 6-18 and 7-1 through 7-12.

"Applied Cryptography—Protocols, Algorithms, and Source Code in C", Bruce Schneider, John Wiley and Sons, 1994, pp. 219-272.

"Shift Register Sequences", Solomon W. Golomb et al, Holden-Day, Inc., 1967, p. 17.

"On a Scrambling Property of Feedback Shift Registers", Ulf Henriksson, IEEE Transactions on Communications, Oct. 1972, pp. 998-999.

Primary Examiner—Bernarr E. Gregory

[57] ABSTRACT

A wireless communications system (110) with increased privacy. The system (110) transmits an encrypted signal between a base station (112) and a wireless terminal (122). In the forward channel, the base station (112) includes an encryptor (130) with a nonlinear scrambler (202) that creates an key signal that has a nonlinear dependence on a long code mask M. The wireless terminal (122) similarly includes a decryptor (164) with a nonlinear scrambler (210) that creates a key signal that has a nonlinear dependence on the long code mask M.

55 Claims, 10 Drawing Sheets

CRYPTOGRAPHIC SYSTEM FOR WIRELESS COMMUNICATIONS

CROSS REFERENCE TO RELATED APPLICATION

This application is related to copending U.S. patent application Ser. No. 08/498,714 entitled Cryptographic System and Method for Wireless Communications by S. Mizikovsky and J. Reeds and commonly assigned to AT&T Corp. (Attorney Docket No. "Mizikovsky 4-8"), filed Jul. 3, 1995.

FIELD OF THE INVENTION

This invention relates in general to the field of communications. More particularly, this invention relates to a cryptographic system for wireless communications.

BACKGROUND OF THE INVENTION

Every day, millions of users communicate with wireless systems. Such communications include voice and data transmissions. Most, if not all, users of these systems do not want the content of the communication to be publicly available. Rather, users generally desire to keep the content of the communication private. Unfortunately, without proper cryptographic precautions, interlopers can easily eavesdrop on communications in some wireless systems. For example, most analog wireless systems do not protect communications from interception. An eavesdropper can access the substance of the transmission by simply tuning a radio to the proper frequency.

Some current digital wireless communication systems take precautions to protect the privacy of users. For example, the Telecommunications Industry Association is drafting a standard for a spread spectrum wireless communications system. The current version of the draft standard was published in December of 1994 as *Mobile Station—Base Station Compatibility Standard for Dual—Mode Spread Spectrum Cellular System* marked PN-3421 (to be published as IS-95a) (hereinafter the "Draft Standard") the teachings of which are incorporated herein by reference. The spread spectrum system described in the Draft Standard is referred to colloquially as Code Division Multiple Access, or CDMA. The Draft Standard includes plans for encrypting voice or data signals prior to transmission for added privacy. Thus, only the true recipient of the voice or data transmission should obtain the content of the transmission.

SUMMARY OF THE INVENTION

A previously unrecognized problem with the cryptographic system that is specified by the Draft Standard is that it permits an eavesdropper to easily and quickly cryptanalyze transmissions encrypted according to the Draft Standard and thereby gain access to the substance of the transmission. The forward traffic channel described in the Draft Standard calls for encrypting an input voice or data signal prior to transmission with a key signal. The Draft Standard also specifies that the input signal be combined with the long code sequence in an Exclusive-OR (i.e. mod 2 addition) function to produce an encrypted output signal.

The Draft Standard calls for generating the long code sequence from a publicly known sequence and a private 42-bit pattern, known as the long code mask. The publicly available sequence is placed in what can be conceptualized as a linear shift register. The output of the linear shift register is combined with the bits of the long code mask. The linear nature of the combination causes the long code sequence to depend linearly on the bits of the private long code mask. This enables an eavesdropper to decrypt a wireless communication with access to 42 bits of the long code sequence. The eavesdropper could use the bits from the long code sequence to create 42 linear equations that depend on the 42 unknown bits of the long code mask. However, the Draft Standard does not call for direct transmission of the bits of the long code sequence. Rather, an Exclusive-OR function combines the bits of the long code sequence with the unknown input signal thus corrupting the bits of the long code sequence. This should diminish the chances that an eavesdropper will successfully cryptanalyze a transmission. This is not the case with the Draft Standard because of the way that the input signal is processed to form frames of 384 bits for error correction.

An eavesdropper can cryptanalyze a transmission by recognizing relationships among the last sixteen bits in each frame of the input signal. Specifically, the eavesdropper can combine selected bits of the input signal from the last sixteen bits in each frame so as to produce modulo-2 sums of zero. By adding (mod 2) the bits of the output signal such that the sum of the corresponding input bits is zero, the eavesdropper can obtain data that represent combinations of bits of the long code sequence. Essentially, the eavesdropper can cancel the effect of the input signal on the output signal. Each bit of the long code sequence is linearly dependent on the 42 bits of the long code mask. Thus, the eavesdropper can combine known bits of the output signal to create equations that are linearly dependent on the bits of the long code mask. Successive frames of data yield 42 equations so as to allow decryption of the communication within less than a second after the communication commences.

Embodiments of the present invention substantially eliminate or reduce the ability of eavesdroppers to cryptanalyze encrypted transmissions. Specifically, exemplary embodiments of the present invention include a nonlinear scrambler coupled to the output of the long code generator. This removes the linearity from the decimated long code sequence and makes it more difficult to determine the long code mask and thus cryptanalyze the encrypted output signal.

BRIEF DESCRIPTION OF THE DRAWING

For a more complete understanding of the present invention and the advantages thereof, reference is now made to the following description taken in conjunction with the accompanying drawings in which like reference numbers indicate like features and wherein.

DETAILED DESCRIPTION

The Telecommunications Industry Association (TIA) sets standards for wireless communications systems. The TIA drafted a standard for a spread spectrum wireless communications system. The system described in the draft standard is referred to as Code Division Multiple Access (CDMA). Part of the draft standard addresses the need for privacy in wireless communications. The current version of the draft standard was published in December of 1994 as *Mobile Station—Base Station Compatibility Standard for Dual-Mode Spread Spectrum Cellular System* marked PN-3421 (to be published as IS-95a) (hereinafter the "Draft Standard") the teachings of which are incorporated herein by reference. Upon detailed analysis of the Draft Standard as outlined below, I discovered that a communication system built in compliance with the Draft Standard is prone to attack by eavesdroppers despite the encryption procedure because of previously unknown weaknesses in the design of the cryptosystem. Embodiments of the present invention can overcome this weakness in the encryption procedure of the Draft Standard by providing a forward channel circuit and method with added security for encrypted communications.

Figure 1:
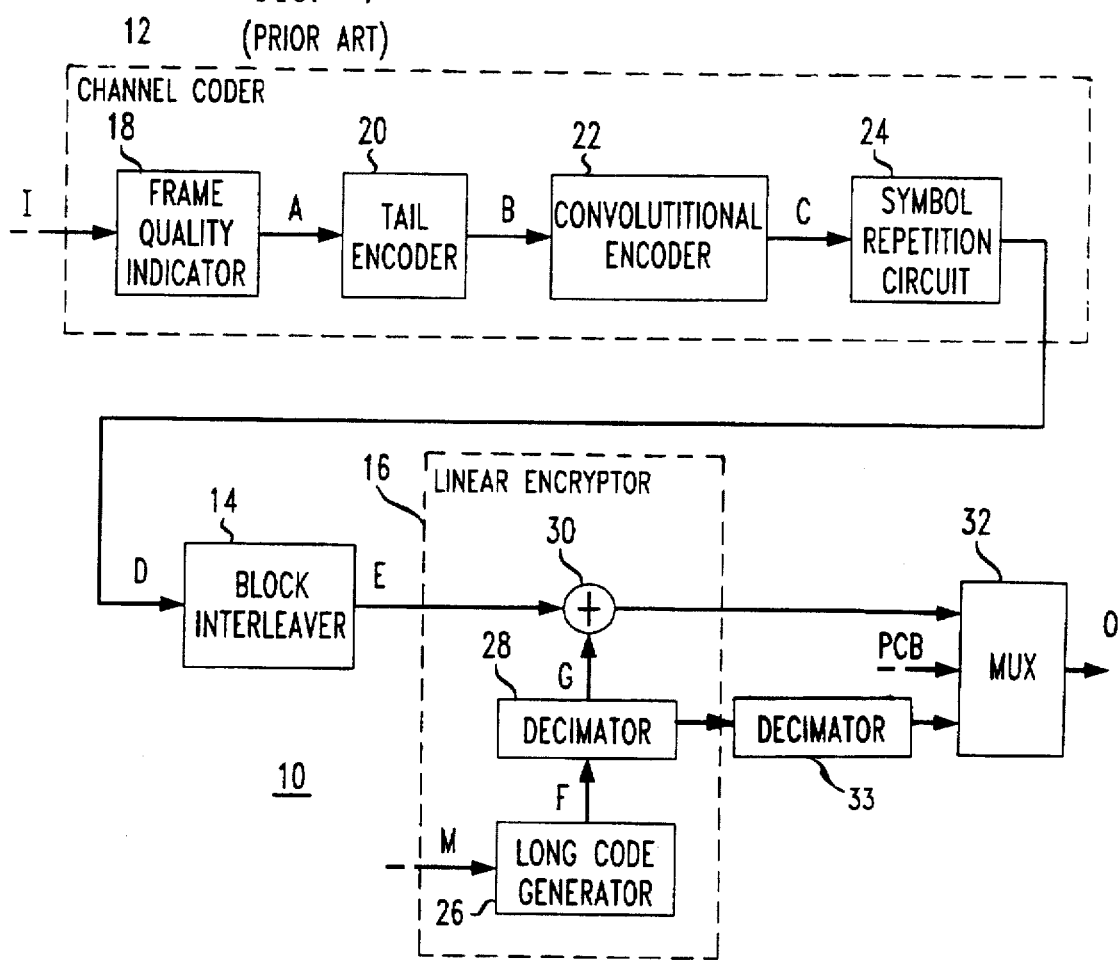
FIG. 1 is a block diagram of a forward channel circuit of a spread spectrum wireless system according to a draft standard published in December 1994 as PN-3421 by the Telecommunications Industry Association.

A detailed examination of the forward channel circuit specified in the Draft Standard provides an understanding of the weakness of the present cryptographic system. FIG. 1 is a block diagram of the forward channel circuit indicated generally at 10 in a base station according to the Draft Standard. Forward channel circuit 10 typically comprises channel coder 12, block interleaver 14 and linear encryptor 16.

Channel coder 12 processes a digital input signal, I. Input signal I may comprise, for example, an encoded digital voice, data or other appropriate signal for transmission in a wireless network. Channel coder 12 and block interleaver 14 minimize the impact on the output of forward channel circuit 10 when consecutive bits of signal I are lost or flipped during transmission. Channel coder 12 typically includes the series combination of frame quality indicator 18, tail encoder 20, convolutional encoder 22, and symbol repetition circuit 24. Channel coder 12, together with block interleaver 14, outputs a processed signal E.

Linear encryptor 16 produces a key signal G to encrypt processed signal E. Linear encryptor 16 typically comprises the series combination of long code generator 26 with decimator 28. Long code generator 26 generates a sequence of bits from a private input signal M referred to as the long code mask. Signal F, output by long code generator 26, is called the long code sequence. Decimator circuit 28 outputs 1 in 64 of the bits of the long code sequence as signal G. The output of decimator 28 is coupled to an input of a modulo-2 adder 30 such as an Exclusive-OR function. Channel coder 12 is also coupled to an input of modulo-2 adder 30. Modulo-2 adder 30 outputs an encrypted version of signal E to a multiplexer 32. A power control bit signal PCB is also provided to multiplexer 32. Multiplexer 32 outputs a signal O as the output of forward channel circuit 10 of FIG. 1. A decimator 33 is coupled between decimator 28 and a control input of multiplexer 32.

In operation, forward channel circuit 10 receives and processes input signal I to provide an encrypted output signal O for transmission. Input signal I is received in frames of bits. The number of bits in each frame may vary based on the information contained in input signal I. For example, each frame in the full data rate case includes 172 bits whereas in the lowest data rate case, each frame includes only 16 bits. Symbol repetition circuit 24 replicates the output of convolutional encoder 22 such that the total number of bits in signal E in each data rate case is the same. To aid in the analysis below, signals E, G, and O are regarded as binary vectors of length 384 bits. Also, each vector has two subscripts. The first subscript, f, refers to the frame of data in producing the vector and the second subscript, j, refers to an element or bit of the vector.

Figure 2:
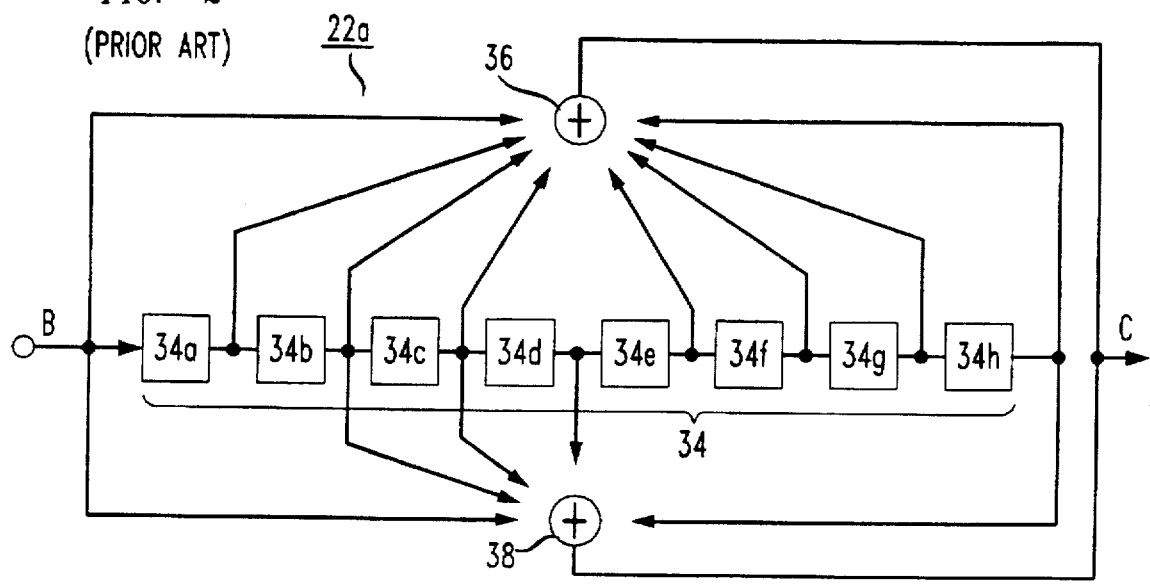
FIG. 2 is a block diagram of a convolution encoder for use in the forward channel circuit of FIG. 1.

Channel coder 12 manipulates input signal I to reduce the effect of burst errors that occur during transmission. Frame quality indicator 18 first creates a signal A by adding a predetermined number of bits to the end of each frame of input signal I. Tail encoder 20 creates a signal B by adding a trailing set of 8 bits equal to zero. Convolutional encoder 22 creates a signal C with double the bits of signal B. An exemplary convolutional encoder is indicated generally at 22a in FIG. 2. Convolutional encoder 22a includes a linear shift register 34 that receives signal B from tail encoder 20. Bit positions 34a, 34b, 34c, 34e, 34g and 34h as well as the current bit of signal B are coupled to a modulo-2 adder 36, such as an Exclusive-OR function, to provide a first output of convolutional encoder 22a. Additionally, bit positions 34b, 34c, 34d and 34h as well as the current bit of signal B are coupled to a modulo-2 adder 38, such as an Exclusive-OR function, to provide a second output of convolutional encoder 22a. An interleaver 39 interleaves the two outputs of convolutional encoder 22a to provide output signal C. Thus, the output bits of convolutional encoder 22a, signal C, are a linear combination, e.g. modulo-2 sum, of the bits of signal B. Symbol repetition circuit 24 and block interleaver 26 further operate on signal C to produce signal E. The bits of signal E are arranged in 16 groups of 24 bits. In the full rate case, the bits of signal E are as shown in TABLE 1 below:

TABLE 1

Interleave Pattern of Interleaver 14 for Full Rate Case

| 1 | 9 | 5 | 13 | 3 | 11 | 7 | 15 | 2 | 10 | 6 | 14 | 4 | 12 | 8 | 16 |
|---|---|---|---|---|---|---|---|---|---|---|---|---|---|---|---|
| 65 | 73 | 69 | 77 | 67 | 75 | 71 | 79 | 66 | 74 | 70 | 78 | 68 | 76 | 72 | 80 |
| 129 | 137 | 133 | 141 | 131 | 139 | 135 | 143 | 130 | 138 | 134 | 142 | 132 | 140 | 136 | 144 |
| 193 | 201 | 197 | 205 | 195 | 203 | 199 | 207 | 194 | 202 | 198 | 206 | 196 | 204 | 200 | 208 |
| 257 | 265 | 261 | 269 | 259 | 267 | 263 | 271 | 258 | 266 | 262 | 270 | 260 | 268 | 264 | 272 |
| 321 | 329 | 325 | 333 | 323 | 331 | 327 | 335 | 322 | 330 | 326 | 334 | 324 | 332 | 328 | 336 |
| 33 | 41 | 37 | 45 | 35 | 43 | 39 | 47 | 34 | 42 | 38 | 46 | 36 | 44 | 40 | 48 |
| 97 | 105 | 101 | 109 | 99 | 107 | 103 | 111 | 98 | 106 | 102 | 110 | 100 | 108 | 104 | 112 |
| 161 | 169 | 165 | 173 | 163 | 171 | 167 | 175 | 162 | 170 | 166 | 174 | 164 | 172 | 168 | 176 |
| 225 | 233 | 229 | 237 | 227 | 235 | 231 | 239 | 226 | 234 | 230 | 238 | 228 | 236 | 232 | 240 |
| 289 | 297 | 293 | 301 | 291 | 299 | 295 | 303 | 290 | 298 | 294 | 302 | 292 | 300 | 296 | 304 |
| 353 | 361 | 357 | 365 | 355 | 363 | 359 | 367 | 354 | 362 | 358 | 366 | 356 | 364 | 360 | 368 |
| 17 | 25 | 21 | 29 | 19 | 27 | 23 | 31 | 18 | 26 | 22 | 30 | 20 | 28 | 24 | 32 |
| 81 | 89 | 85 | 93 | 83 | 91 | 87 | 95 | 82 | 90 | 86 | 94 | 84 | 92 | 88 | 96 |
| 145 | 153 | 149 | 157 | 147 | 155 | 151 | 159 | 146 | 154 | 150 | 158 | 148 | 156 | 152 | 160 |
| 209 | 217 | 213 | 221 | 211 | 219 | 215 | 223 | 210 | 218 | 214 | 222 | 212 | 220 | 216 | 224 |
| 273 | 281 | 277 | 285 | 275 | 283 | 279 | 287 | 274 | 282 | 278 | 286 | 276 | 284 | 280 | 288 |
| 337 | 345 | 341 | 349 | 339 | 347 | 343 | 351 | 338 | 346 | 342 | 350 | 340 | 348 | 344 | 352 |
| 49 | 57 | 53 | 61 | 51 | 59 | 55 | 63 | 50 | 58 | 54 | 62 | 52 | 60 | 56 | 64 |
| 113 | 121 | 117 | 125 | 115 | 123 | 119 | 127 | 114 | 122 | 118 | 126 | 116 | 124 | 120 | 128 |
| 177 | 185 | 181 | 189 | 179 | 187 | 183 | 191 | 178 | 186 | 182 | 190 | 180 | 188 | 184 | 192 |
| 241 | 249 | 245 | 253 | 243 | 251 | 247 | 255 | 242 | 250 | 246 | 254 | 244 | 252 | 248 | 256 |
| 305 | 313 | 309 | 317 | 307 | 315 | 311 | 319 | 306 | 314 | 310 | 318 | 308 | 316 | 312 | 320 |
| 369 | 377 | 373 | 381 | 371 | 379 | 375 | 383 | 370 | 378 | 374 | 382 | 372 | 380 | 376 | 384 |

It is noted that the numbers in TABLE 1 refer to the bit positions in signal C from convolutional encoder 22. Additionally, each column in TABLE 1 represents one of the 16 groups of 24 bits. The operation of channel coder 12 is public and thus a potential eavesdropper can access the information contained in TABLE 1.

Figure 3:
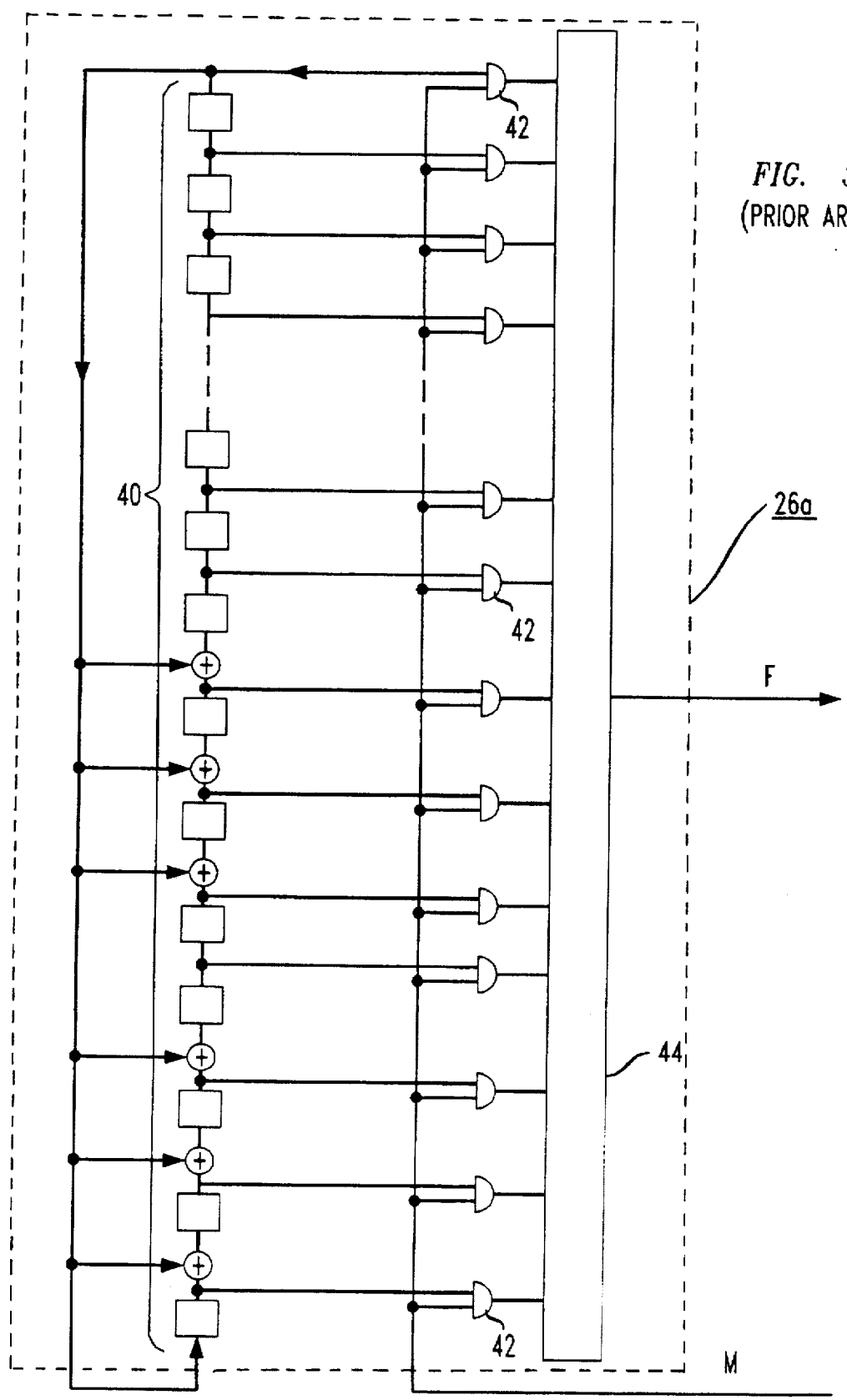
FIG. 3 is a block diagram of an embodiment of a long code generator for use in the forward channel circuit of FIG. 1.

Linear encryptor 16 creates a signal G to be summed (modulo-2) with signal E. Long code generator 26 creates a putatively private long code sequence F from a private long code mask M. An exemplary long code generator indicated generally at 26a is shown in FIG. 3. Long code generator 26a includes a linear feedback shift register 40 that contains a publicly known quantity having 42 bits. Each bit of the shift register is combined in a corresponding AND-gate 42 with a corresponding bit of the private long code mask M. The output of each AND-gate is coupled to an adder 44. Adder 44 comprises a modulo-2 or Exclusive-OR adder. Adder 44 adds the outputs of and-gates 42 together to produce a bit of the long code sequence F. The relationship between F and M can be expressed as:

$$F_{f,j} = \sum_i m_i x_{i,f,j} \tag{1}$$

where $x_{i,f,j}$ is the content of the $i^{th}$ cell of the linear feedback shift register 40 after having stepped $j$ times during the processing of the $f^{th}$ frame, $m_i$ is the $i^{th}$ bit of the long code mask and $F_{f,j}$ is the $j^{th}$ bit of the long code sequence since the beginning of the $f^{th}$ frame. Decimator 28 outputs 1 in every 64 bits of signal F as signal G which is used to encrypt signal E. Thus, each bit of signal G can also be expressed as:

$$G_{f,j} = \sum_i m_i x_{i,f,(64j)} \tag{2}$$

Signal E from block interleaver 14 is modulo-2 summed with a signal G of linear encryptor 16 at modulo-2 adder 30. Signal E is added to signal G with modulo-2 arithmetic. For each bit output by modulo-2 adder 30, multiplexer 32 transmits either the output of modulo-2 adder 30 or the PCB signal as the output signal O of forward channel circuit 10. The PCB signal is a power control signal that overwrites a pair of the first 17 bits in each group of 24 bits in signal E.

Thus, only the last 7 bits of each group of 24 bits in signal O is free of the effect of the PCB signal.

The long code sequence F used to encrypt the transmission is linearly dependent on the long code mask M (Equation (1)). Further, channel encoder 12 manipulates the bits of input signal I such that the bits of signal D are related to the bits of signal I by known, linear algebraic equations. Thus, if a potential eavesdropper can manipulate the output signal O to remove the effect of the input signal L the eavesdropper will have data that depends linearly on the unknown bits of the long code mask M. With this data, the eavesdropper can use standard techniques for the solution of linear equations to determine the long code mask M.

The bits of signal E output by channel coder 12 can be combined to create linear equations that depend only on the bits of the long code mask M. To see this relationship, consider the mathematical representation of forward channel circuit 10. First, a bookkeeping detail. Due to the effect of the PCB signal, the only bits that the eavesdropper can rely on are the last 7 bits of each group of 24 bits in output signal O. Thus, in the $f^{th}$ frame, for all bit positions $j$ falling into the last 7 bits of each of the groups of bits, the output of forward channel circuit 10 can be described by the equation:

$$E_{f,j} \oplus G_{f,j} = O_{f,j} \tag{3}$$

In each frame, Equation (3) governs the value of 112 bits of signal I input into forward channel circuit 10. Equation (2) above states that G depends on the unknown bits $m_i$ of the long code mask. The vector E is unknown to the eavesdropper. Thus to create an equation that only depends on $m_i$, the effect of the vector E must be removed. If a vector $\alpha$ can be found such that $\alpha_j$ is zero for all values of $j$ among the first seventeen bits in each group of 24 bits and such that $$<\alpha, E> = 0 \tag{4}$$

then the effect of E on the output vector O can be removed. It is noted that equation (4) refers to the dot product with modulo-2 arithmetic of the vectors $\alpha$ and E. In the vector $\alpha$, the bits are selected such that the dot product with E creates a sum of bits in E that equal zero. Taking the dot product of each vector in Equation (3) with α produces:

$$\langle \alpha, E_j \rangle \oplus \langle \alpha, G_j \rangle = \langle \alpha, O_j \rangle. \tag{5}$$

Substituting Equation (4) into equation (5), it is seen that:

$$\langle \alpha, G_j \rangle = \langle \alpha, O_j \rangle. \tag{6}$$

As discussed above in Equation (2), signal G is a decimated version of signal F and each bit is thus linearly dependent on the bits of the long code mask $m_i$. Equation (6) can thus be expanded as follows:

$$\sum_j \alpha_j G_{f,j} = \sum_j \alpha_j O_{f,j}. \tag{7}$$

Substituting equation (2) into equation (7) reveals that:

$$\sum_j \alpha_j \sum_i m_i x_{i,f(64j)} = \sum_j \alpha_j O_{f,j} \tag{8}$$

This is a linear equation wherein the bits $m_i$ of the long code mask are the only unknowns. Thus, the eavesdropper can use known techniques to determine the bits of the long code mask provided enough data is gathered to produce 42 equations. The eavesdropper must first identify the vectors α that satisfy Equation (3). Channel coder 12 makes this possible.

To find the vectors α that satisfy Equation (3), trace the last 16 bits of data in a signal B through convolutional encoder 22. Assume the last eight bits are 0 as set by tail encoder 20. Further assume that the prior eight bits are a, b, c, d, e, f, g, and h with a being the bit that is followed by the eight zero bits. Then, the last sixteen bits of signal C are:

$$c_{369} = a \oplus b \oplus c \oplus e \oplus g \oplus h; \tag{9}$$

$$c_{370} = b \oplus c \oplus d \oplus h; \tag{10}$$

$$c_{371} = a \oplus b \oplus d \oplus f \oplus g; \tag{11}$$

$$c_{372} = a \oplus b \oplus c \oplus g; \tag{12}$$

$$c_{373} = a \oplus c \oplus e \oplus f; \tag{13}$$

$$c_{374} = a \oplus b \oplus f; \tag{14}$$

$$c_{375} = b \oplus d \oplus e; \tag{15}$$

$$c_{376} = a \oplus e; \tag{16}$$

$$c_{377} = a \oplus c \oplus d; \tag{17}$$

$$c_{378} = d; \tag{18}$$

$$c_{379} = b \oplus c; \tag{19}$$

$$c_{380} = c; \tag{20}$$

$$c_{381} = a \oplus b; \tag{21}$$

$$c_{382} = b; \tag{23}$$

$$c_{383} = a; \tag{24}$$

and $$c_{384} = a. \tag{25}$$

Combinations of the bits of signal C that yield a modulo-2 sum of zero satisfy Equation (3). For example, the sum of bits $c_{383}$ and $c_{384}$ is zero because the bits are equal. It is noted that after symbol repetition and interleaving bits 383 and 384 of signal C become bits 192 and 384 of signal E, respectively. Thus, a vector α that results in the sum of these two bits will yield a linear equation in the bits $m_i$ of the long code mask M as follows:

$$G_{f,192} \oplus G_{f,384} = O_{f,192} \oplus O_{f,384}. \tag{26}$$

Equation (26) can be rewritten as:

$$\sum_i m_i(x_{i,f(64\cdot192)} \oplus x_{i,f(64\cdot384)}) = O_{f,192} \oplus O_{f,384} \tag{27}$$

In Equation (27), the only unknowns are the bits $m_i$ of the long code mask. Other combinations that result in vectors α are as follows:

$$c_{369} \oplus c_{370} \oplus c_{371} \oplus c_{373} \oplus c_{379} \oplus c_{383} = 0; \tag{28}$$

$$c_{377} \oplus c_{378} \oplus c_{379} \oplus c_{381} = 0; \tag{29}$$

$$c_{373} \oplus c_{374} \oplus c_{375} \oplus c_{377} \oplus c_{383} = 0; \tag{30}$$

$$c_{381} \oplus c_{382} \oplus c_{383} = 0; \tag{31}$$

$$c_{371} \oplus c_{372} \oplus c_{373} \oplus c_{375} \oplus c_{381} = 0; \tag{32}$$

$$c_{379} \oplus c_{380} \oplus c_{381} \oplus c_{383} = 0; \tag{33}$$

and $$c_{375} \oplus c_{376} \oplus c_{377} \oplus c_{379} = 0. \tag{34}$$

Thus, in the full rate case, the eavesdropper can create at least eight combinations of bits from one frame of data that cancel the effect of the input signal I on the output signal O. With just six frames of data the eavesdropper can create more than the 42 equations necessary to determine the value of the 42 bits of the long code mask M. This data can be gathered in less than one second. In the lower rate cases, the task of the eavesdropper is somewhat simplified. TABLE 2 below shows the bits of signal E with the number of the bit position for each bit as in signal C output by the convolutional encoder.

TABLE 2

Interleave Pattern of Interleaver 14 for Low Rate Case

| 1 | 2 | 1 | 2 | 1 | 2 | 1 | 2 | 1 | 2 | 1 | 2 | 1 | 2 | 1 | 2 |
|---|---|---|---|---|---|---|---|---|---|---|---|---|---|---|---|
| 9 | 10 | 9 | 10 | 9 | 10 | 9 | 10 | 9 | 10 | 9 | 10 | 9 | 10 | 9 | 10 |
| 17 | 18 | 17 | 18 | 17 | 18 | 17 | 18 | 17 | 18 | 17 | 18 | 17 | 18 | 17 | 18 |
| 25 | 26 | 25 | 26 | 25 | 26 | 25 | 26 | 25 | 26 | 25 | 26 | 25 | 26 | 25 | 26 |
| 33 | 34 | 33 | 34 | 33 | 34 | 33 | 34 | 33 | 34 | 33 | 34 | 33 | 34 | 33 | 34 |
| 41 | 42 | 41 | 42 | 41 | 42 | 41 | 42 | 41 | 42 | 41 | 42 | 41 | 42 | 41 | 42 |

TABLE 2-continued

| \multicolumn{16}{c}{Interleave Pattern of Interleaver 14 for Low Rate Case} |
|---|---|---|---|---|---|---|---|---|---|---|---|---|---|---|---|
| 5 | 6 | 5 | 6 | 5 | 6 | 5 | 6 | 5 | 6 | 5 | 6 | 5 | 6 | 5 | 6 |
| 13 | 14 | 13 | 14 | 13 | 14 | 13 | 14 | 13 | 14 | 13 | 14 | 13 | 14 | 13 | 14 |
| 21 | 22 | 21 | 22 | 21 | 22 | 21 | 22 | 21 | 22 | 21 | 22 | 21 | 22 | 21 | 22 |
| 29 | 30 | 29 | 30 | 29 | 30 | 29 | 30 | 29 | 30 | 29 | 30 | 29 | 30 | 29 | 30 |
| 37 | 38 | 37 | 38 | 37 | 38 | 37 | 38 | 37 | 38 | 37 | 38 | 37 | 38 | 37 | 38 |
| 45 | 46 | 45 | 46 | 45 | 46 | 45 | 46 | 45 | 46 | 45 | 46 | 45 | 46 | 45 | 46 |
| 3 | 4 | 3 | 4 | 3 | 4 | 3 | 4 | 3 | 4 | 3 | 4 | 3 | 4 | 3 | 4 |
| 11 | 12 | 11 | 12 | 11 | 12 | 11 | 12 | 11 | 12 | 11 | 12 | 11 | 12 | 11 | 12 |
| 19 | 20 | 19 | 20 | 19 | 20 | 19 | 20 | 19 | 20 | 19 | 20 | 19 | 20 | 19 | 20 |
| 27 | 28 | 27 | 28 | 27 | 28 | 27 | 28 | 27 | 28 | 27 | 28 | 27 | 28 | 27 | 28 |
| 35 | 36 | 35 | 36 | 35 | 36 | 35 | 36 | 35 | 36 | 35 | 36 | 35 | 36 | 35 | 36 |
| 43 | 44 | 43 | 44 | 43 | 44 | 43 | 44 | 43 | 44 | 43 | 44 | 43 | 44 | 43 | 44 |
| 7 | 8 | 7 | 8 | 7 | 8 | 7 | 8 | 7 | 8 | 7 | 8 | 7 | 8 | 7 | 8 |
| 15 | 16 | 15 | 16 | 15 | 16 | 15 | 16 | 15 | 16 | 15 | 16 | 15 | 16 | 15 | 16 |
| 23 | 24 | 23 | 24 | 23 | 24 | 23 | 24 | 23 | 24 | 23 | 24 | 23 | 24 | 23 | 24 |
| 31 | 32 | 31 | 32 | 31 | 32 | 31 | 32 | 31 | 32 | 31 | 32 | 31 | 32 | 31 | 32 |
| 39 | 40 | 39 | 40 | 39 | 40 | 39 | 40 | 39 | 40 | 39 | 40 | 39 | 40 | 39 | 40 |
| 47 | 48 | 47 | 48 | 47 | 48 | 47 | 48 | 47 | 48 | 47 | 48 | 47 | 48 | 47 | 48 |

It is noted that each bit is repeated eight times. Thus, in the low rate case, the eavesdropper can determine the bits of the long code mask M with a single frame of data. Thus, it is easier in the low rate case to create equations to determine the bits of the long code mask M.

Figure 4:
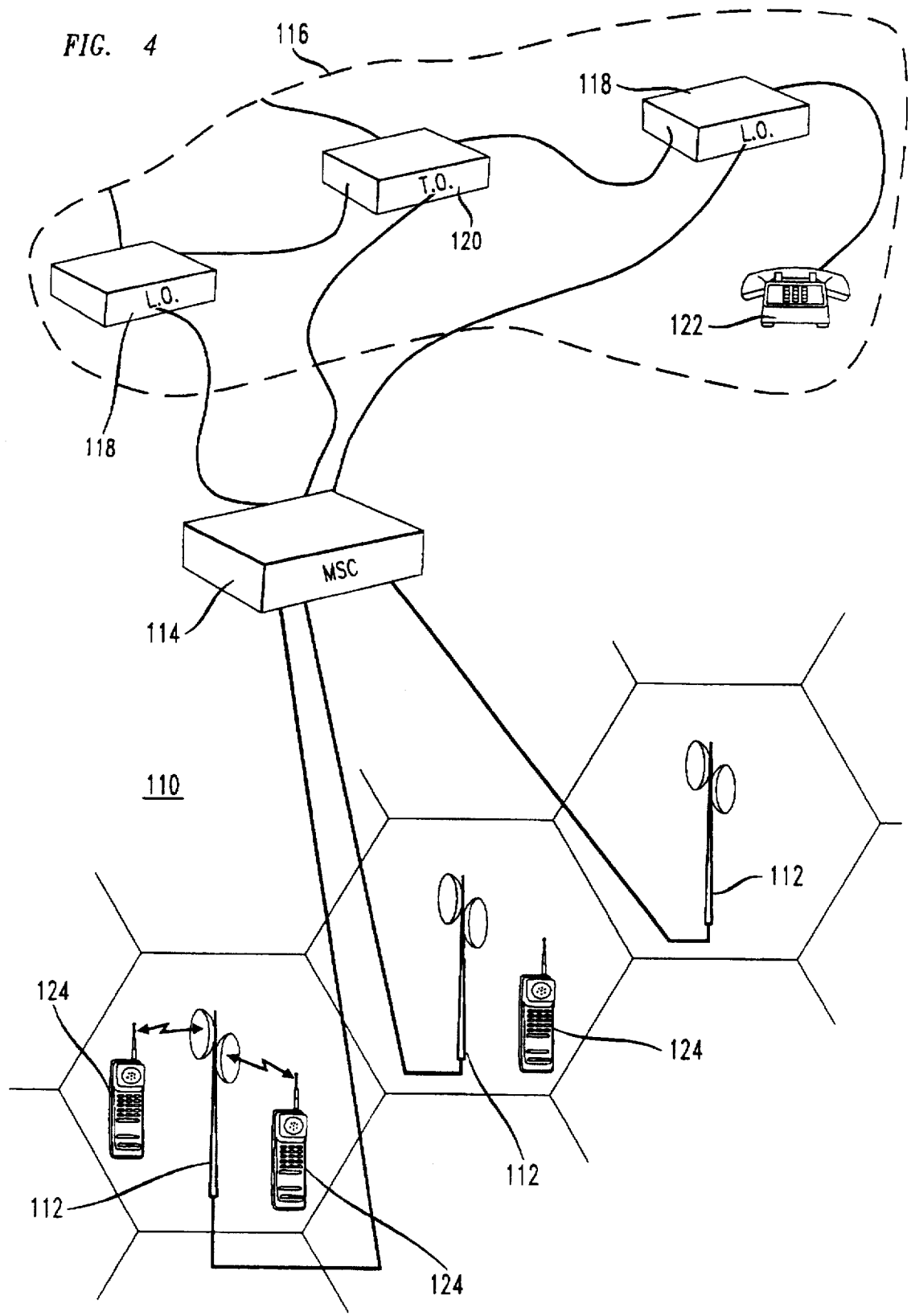
FIG. 4 is a block diagram of a spread spectrum wireless infrastructure incorporating a nonlinear scrambler constructed according to the teachings of the present invention.

FIG. 4 is a block diagram of a wireless system indicated generally at that implements a spread spectrum technology and is constructed according to the teachings of the present invention. Wireless system 110 includes a plurality of base stations 112 that are coupled to and in communication with a Mobile Switching Center (MSC) 114. MSC 114 is coupled to and in communication with the public switched telephone network (PSTN) 116, including one or more local offices 118 and one or more toll offices 120. PSTN 116 further includes fixed terminals 122 coupled to and in communication with local offices 118 and toll offices 120. Fixed terminals may be coupled to PSTN by any appropriate telecommunications cable including, for example, copper wires, fiber optic cables and the like. Wireless system 110 also includes one or more wireless terminals 124. The forward channel of each wireless terminal 124 and each base station 112 includes an encryptor as described below for providing increased transmission privacy when compared to prior systems and methods.

In operation, wireless system 110 transmits an encrypted signal between a base station 112 and a wireless terminal 124. For example, a communication to a wireless terminal 124 may be initiated at a fixed terminal 122. Local office 118 and MSC 114 connect fixed terminal 122 to an appropriate base station 112. Base station 112 encrypts a signal from fixed terminal 122 and transmits the encrypted signal. The appropriate wireless terminal 124 receives the encrypted signal. Wireless terminal 124 decrypts the signal to complete the communication.

Figure 5:
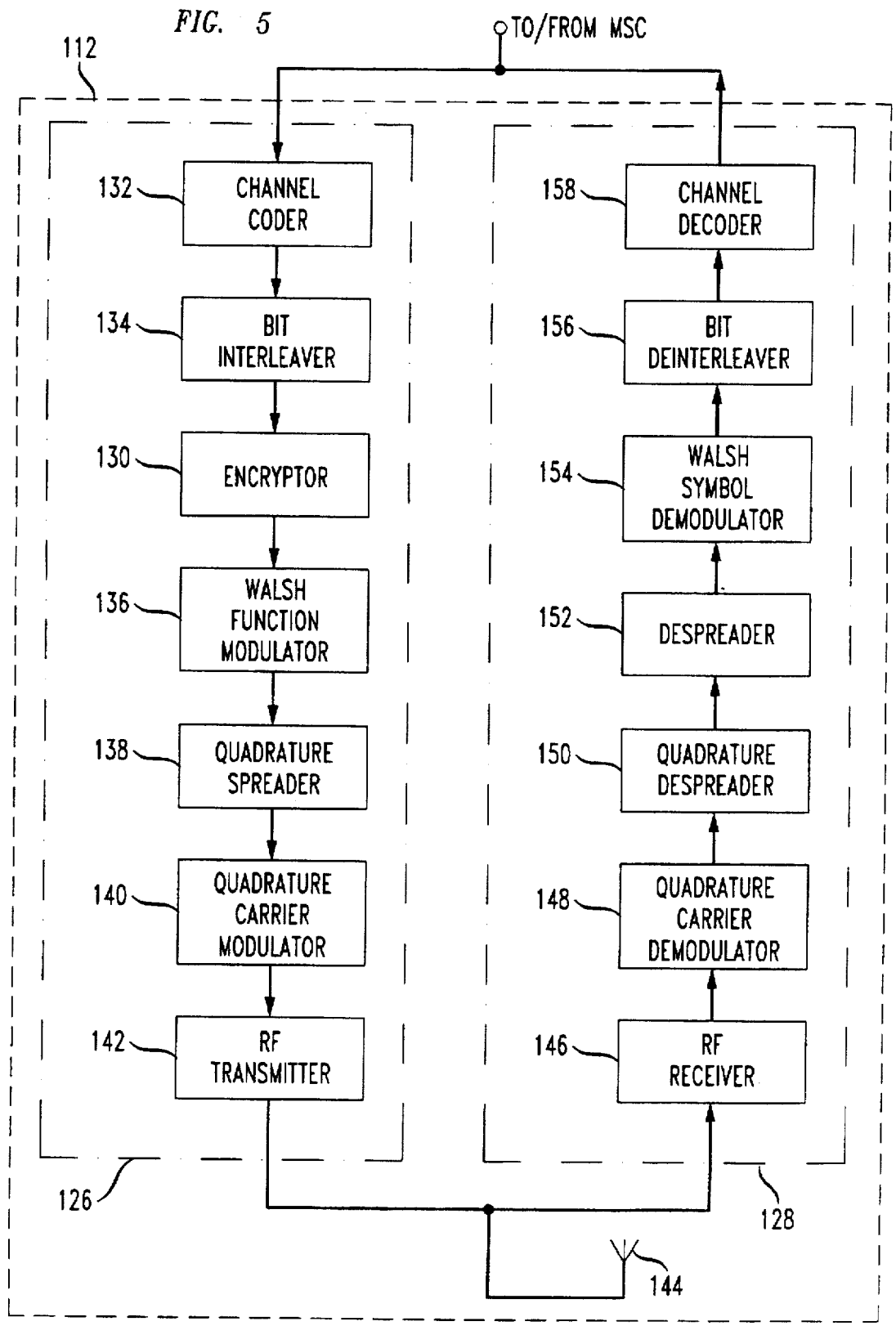
FIG. 5 is a block diagram of a base station in the spread spectrum wireless system of FIG. 4.

FIG. 5 is a block diagram of one embodiment of a base station indicated generally at 112 and constructed according to the teachings of the present invention. Base station 112 includes a forward channel 126 for transmitting signals to a wireless terminal 124. Base station 112 also includes a reverse channel 128 for receiving signals from a wireless terminal 124. Forward channel 126 includes an encryptor 130 that creates a key signal that is a nonlinear function of a private long code mask. Thus, forward channel 126 provides increased transmission privacy.

Forward channel 126 includes a channel coder 132 that is coupled to MSC 114. Forward channel 126 further includes the series combination of bit interleaver 134, encryptor 130, Walsh function modulator 136, quadrature spreader 138, quadrature carrier modulator 140, and RF transmitter 142. RF transmitter 142 is coupled to antenna 144. Reverse channel 128 includes the series combination of RF receiver 146, quadrature carrier demodulator 148, quadrature despreader 150, despreader 152, Walsh symbol demodulator 154, bit deinterleaver 156, and channel decoder 158.

In operation, forward channel 126 processes and encrypts a signal from MSC 114 for transmission on antenna 144. MSC 114 provides a digital signal to channel coder 132. Channel coder 132 codes the signal for error correction after transmission. Bit interleaver 134 rearranges the order of the bits in the signal so as to minimize the impact of error bursts. Encryptor 130 uses a nonlinear encryption signal to encrypt the signal from bit interleaver 134. Walsh function modulator 136 modulates the signal by multiplying the signal with a selected Walsh function. Quadrature spreader 138 spreads the signal with a selected pseudo-noise (PN) code that is unique to the transmission between fixed terminal 122 and wireless terminal 124. Quadrature carrier modulator 140 modulates the signal for transmission by RF transmitter 142 on antenna 144.

Reverse channel 128 receives a signal from a wireless terminal 124 at antenna 144 and receiver 146. Quadrature carrier demodulator 148 demodulates the signal from the carrier signal for processing. Quadrature despreader 150 uses the appropriate PN signal to despread the signal from wireless terminal 124. Despreader 152 uses a private key signal to further despread the signal from wireless terminal 124. Walsh symbol demodulator 154 demodulates the signal with an appropriate Walsh function. Bit deinterleaver 156 rearranges the bits in the signal to undo an interleaving operation performed by wireless terminal 124. Channel decoder 158 uses error correction techniques to correct errors in the signal from wireless terminal 124.

Figure 6:
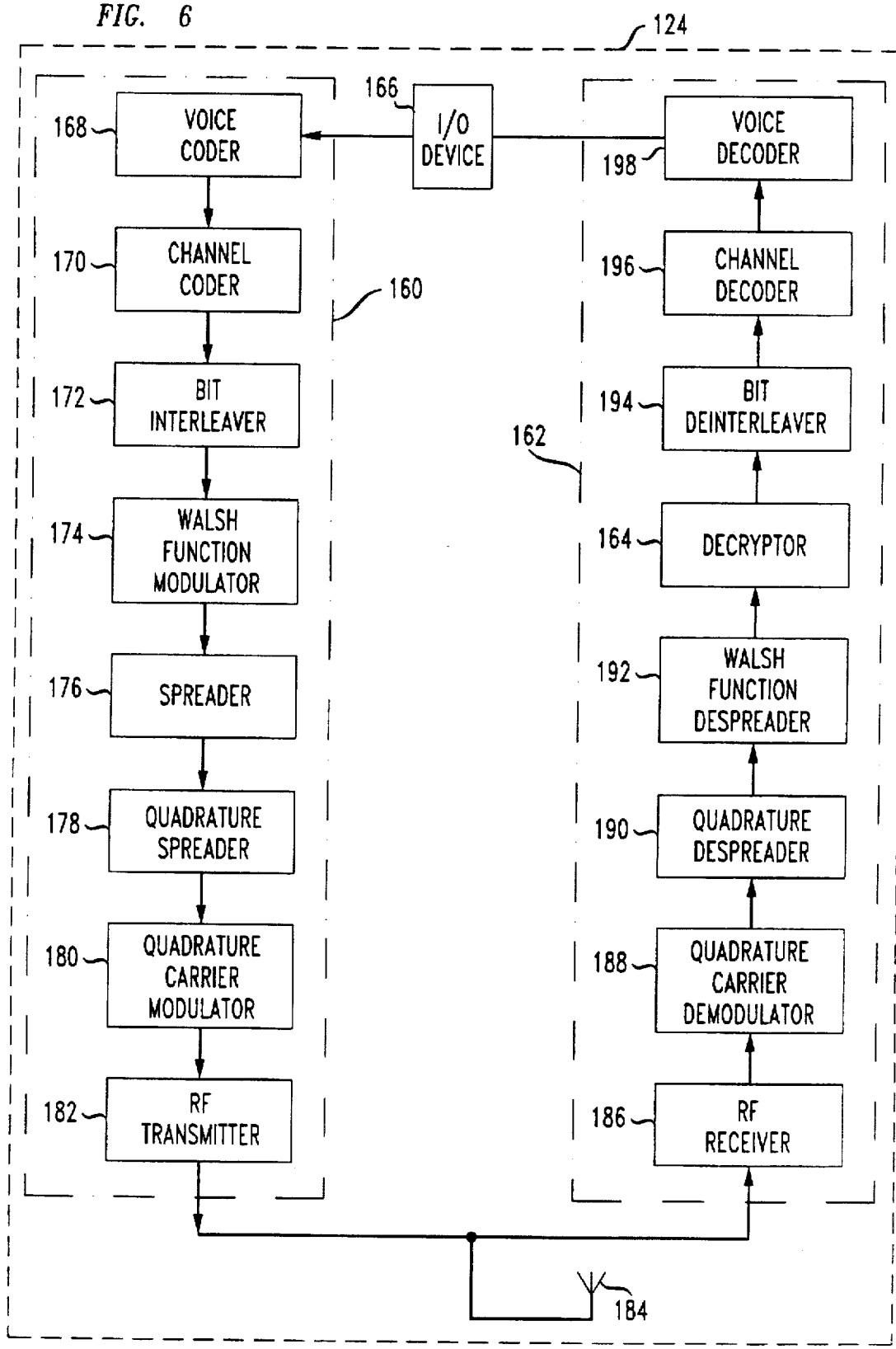
FIG. 6 is a block diagram of a wireless terminal in the spread spectrum wireless system of FIG. 4.

FIG. 6 is a block diagram of a wireless terminal indicated generally at 124 and constructed according to the teachings of the present invention. Wireless terminal 124 includes a reverse channel 160 for transmitting signals to a base station 112. Wireless terminal 124 also includes a forward channel 162 for receiving signals from a base station 112. Forward channel 162 includes a decryptor 164 that creates a key signal that is a nonlinear function of a private long code mask. Thus, forward channel 162 provides increased transmission privacy.

Wireless terminal 168 includes an input/output (I/O) device 166. I/O device 166 may comprise a speaker and a microphone. Alternatively, I/O device 166 may comprise an appropriate data port. Reverse channel 160 includes a voice coder 168 coupled to I/O device 166. Voice coder 168 is coupled to the series combination of channel coder 170, bit interleaver 172, Walsh function modulator 174, spreader 176, quadrature spreader 178, quadrature carrier modulator 180, and RF transmitter 182. RF transmitter 182 is coupled to antenna 184. Reverse channel 162 includes the series combination of RF receiver 186, quadrature carrier demodulator 188, quadrature despreader 190, Walsh function demodulator 192, decryptor 164, bit deinterleaver 194, channel decoder 196 and voice decoder 198. Voice decoder 198 is coupled to I/O device 166.

In operation, reverse channel 160 processes a signal from a user for transmission on antenna 184. Voice coder 168 codes a digital signal from I/O device 166. Channel coder 170 codes the signal for error correction after transmission. Bit interleaver 172 rearranges the order of the bits in the signal so as to minimize the impact of error bursts. Walsh function modulator 174 modulates the signal by multiplying the signal with a selected Walsh function. Spreader 176 uses a key signal to spread the signal from Walsh function modulator 174. Quadrature spreader 178 spreads the signal with a selected pseudo-noise (PN) code that is unique to the transmission between fixed terminal 122 and wireless terminal 124. Quadrature carrier modulator 180 modulates the signal for transmission by RF transmitter 182 on antenna 184.

Forward channel 162 receives a signal from base station 112 at antenna 184 and receiver 186. Quadrature carrier demodulator 188 demodulates the signal from the carrier signal for processing. Quadrature despreader 190 uses the appropriate PN signal to despread the signal from base station 112. Walsh function demodulator 192 demodulates the signal with an appropriate Walsh function. Decryptor 164 uses a private key signal to descramble the signal from base station 112. Bit deinterleaver 194 rearranges the bits in the signal to undo an interleaving operation performed by base station 112. Channel decoder 196 uses error correction techniques to correct errors in the signal from base station 112. Voice decoder 198 decodes the signal for I/O device 166 to complete the transmission.

Figure 7:
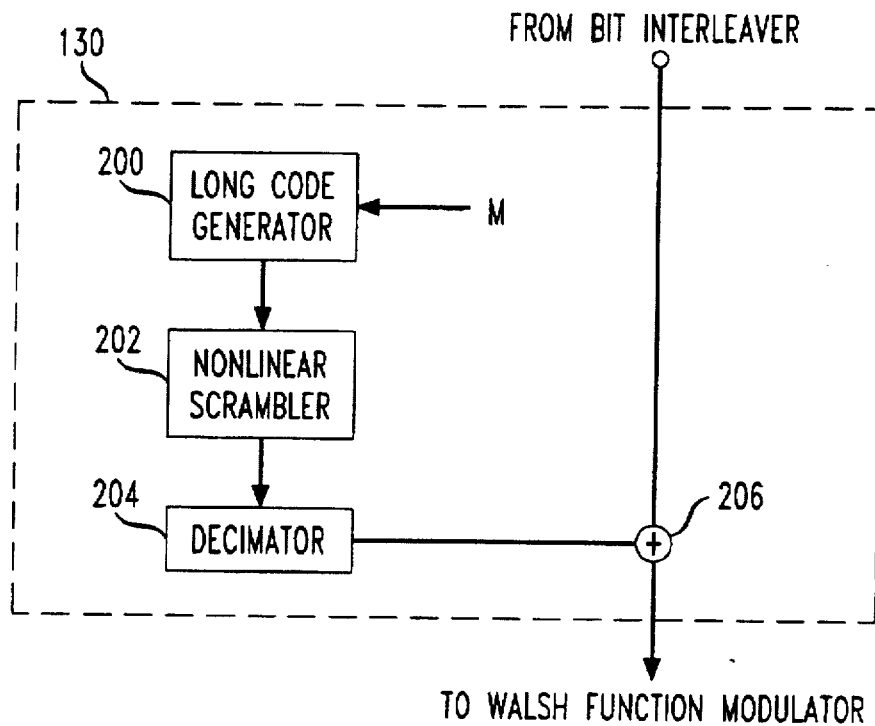
FIG. 7 is an embodiment of an encryptor for use in the base station of FIG. 5.

FIG. 7 is an embodiment of an encryptor indicated generally at 130 for use in forward channel 126 of FIG. 5. Encryptor 130 generates a key signal with the series combination of a long code generator 200, a nonlinear scrambler 202 and a decimator 204. The output of decimator 204 is coupled to a first input of a modulo-2 adder 206. The second input of adder 206 is coupled to bit interleaver 134.

In operation, long code generator 200 generates a sequence of bits from a private long code mask. Long code generator 200 may comprise the long code generator 22a of FIG. 3 such that the bits of the long code sequence depend linearly on the bits of the long code mask. Nonlinear scrambler 202 scrambles the bits of the long code sequence such that the output bits of nonlinear scrambler 202 have a nonlinear dependence on the bits of the long code mask. Exemplary embodiments of nonlinear scrambler 202 are described below with respect to FIGS. 9 through 15. The nonlinearity created by nonlinear scrambler 202 may vary in complexity. For example, nonlinear scrambler 202 may include a feedback loop. Alternatively, nonlinear scrambler 202 may comprise a simple combinational logic circuit that introduces a nonlinearity into the long code sequence. Thus, a system constructed according to the teachings of the present invention will increase the difficulty for an eavesdropper to successfully obtain the bits of the long code mask M. Decimator 204 selects bits output from nonlinear scrambler 202 with a known frequency. For example, decimator 204 may output 1 in 64 of the bits output by nonlinear scrambler 202. Adder 206 adds (modulo-2) the signal from bit interleaver 134 with the signal from decimator 204.

Figure 8:
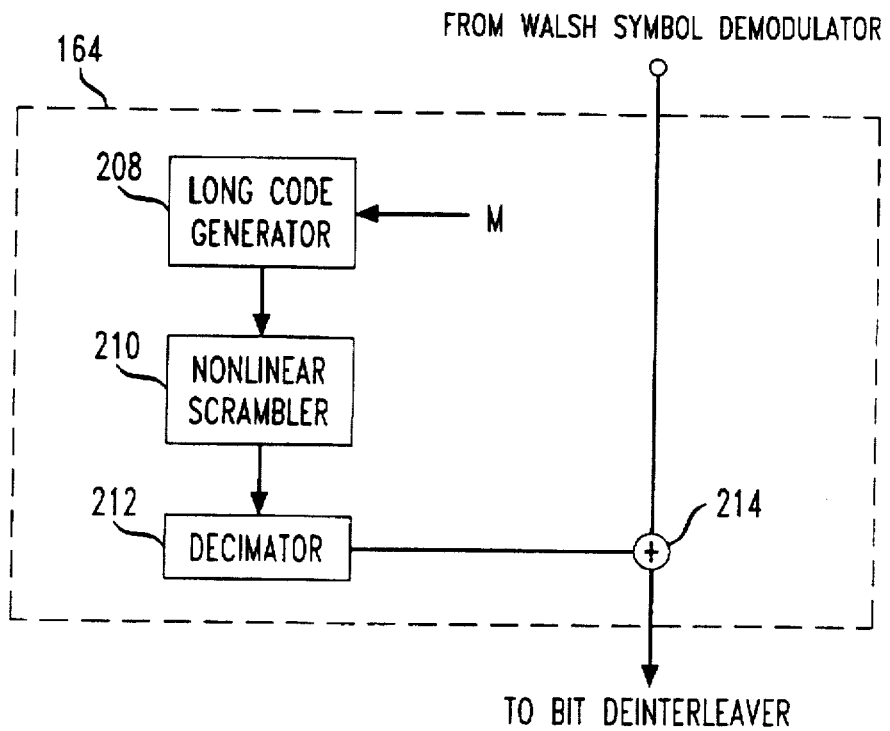
FIG. 8 is an embodiment of a decryptor for use in the wireless terminal of FIG. 6.

FIG. 8 is an embodiment of a decryptor indicated generally at 164 for use in forward channel 162 of FIG. 6. Decryptor 164 generates a key signal with the series combination of a long code generator 208, a nonlinear scrambler 210 and a decimator 212. The output of decimator 212 is coupled to a first input of a modulo-2 adder 214. The second input of adder 214 is coupled to Walsh function demodulator 192.

In operation, decryptor 164 creates a key signal to decrypt a signal received from a base station 112. As such, decryptor 164 independently creates a key signal that is identical to the key signal created in encryptor 130. Thus, long code generator 208 generates a sequence of bits from a private long code mask. Long code generator 208 may comprise the long code generator 22a of FIG. 3 such that the bits of the long code sequence depend linearly on the bits of the long code mask. Nonlinear scrambler 210 scrambles the bits of the long code sequence such that the output bits of nonlinear scrambler 210 have a nonlinear dependence on the bits of the long code mask. Exemplary embodiments of nonlinear scrambler 210 are described below with respect to FIGS. 9 through 15. The nonlinearity created by nonlinear scrambler 210 may vary in complexity. For example, nonlinear scrambler 210 may include a feedback loop. Alternatively, nonlinear scrambler 210 may comprise a simple combinational logic circuit that introduces a nonlinearity into the long code sequence. Thus, a system constructed according to the teachings of the present invention will increase the difficulty for an eavesdropper to successfully obtain the bits of the long code mask M. Decimator 212 selects bits output from nonlinear scrambler 210 with a known frequency. For example, decimator 212 may output 1 in 64 of the bits output by nonlinear scrambler 210. Adder 214 adds the signal from Walsh function demodulator 192 with the signal from decimator 212.

Figure 9:
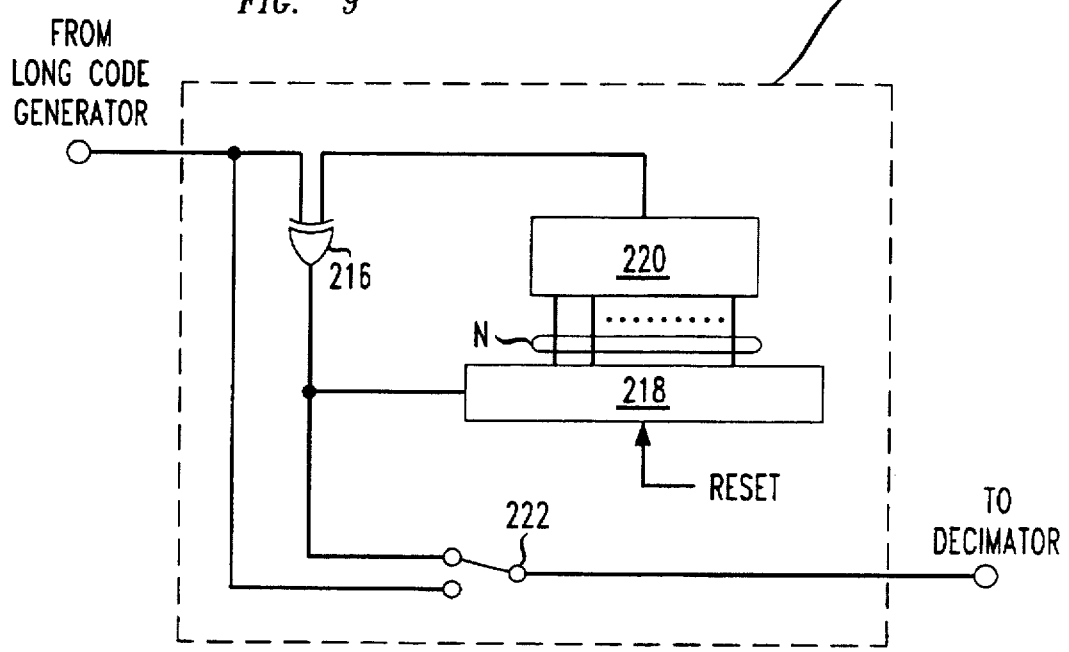
FIG. 9 is an embodiment of a nonlinear scrambler for use in the encryptor of FIG. 7 and the decryptor of FIG. 8.

FIG. 9 is one embodiment of a nonlinear scrambler indicated generally at 202a and constructed according to the teachings of the present invention. It is noted that each circuit shown in FIGS. 9 through 15 can be used either in encryptor 130 or decryptor 164. For simplicity, FIGS. 9 through 15 are described only with respect to encryptor 130. Scrambler 202a comprises an Exclusive-OR gate 216, a shift register 218, a logic circuit 220 and a switch 222. The output of long code generator 200 and the output of logic circuit 220 are coupled to the inputs of Exclusive-OR gate 216. Exclusive-OR gate 216 provides an output to shift register 218 and to switch 222. Logic circuit 220 taps two or more cells of shift register 218. Finally, the output of long code generator 200 is also coupled to switch 222.

In operation, scrambler 202a outputs a sequence of bits that are a nonlinear combination of the bits of the long code sequence by use of a feedback loop. Exclusive-OR gate 216 outputs bits to shift register 218. The bits shift through shift register 218 and are selectively combined in logic circuit 220. Logic circuit 220 may comprise a simple AND-gate. Alternatively, logic circuit 220 may comprise a more complicated combinational logic circuit. Logic circuit 220 provides a second input to Exclusive-OR gate 216 such that the bits entering shift register 218 ultimately depend on the current bit of the long code sequence and a logical combination of prior bits output by Exclusive-OR gate 216. Switch 222 may by-pass the effect of scrambler 202a by coupling long code generator 200 directly to decimator 204. A reset signal is also provided to clear shift register 218.

Figure 10:
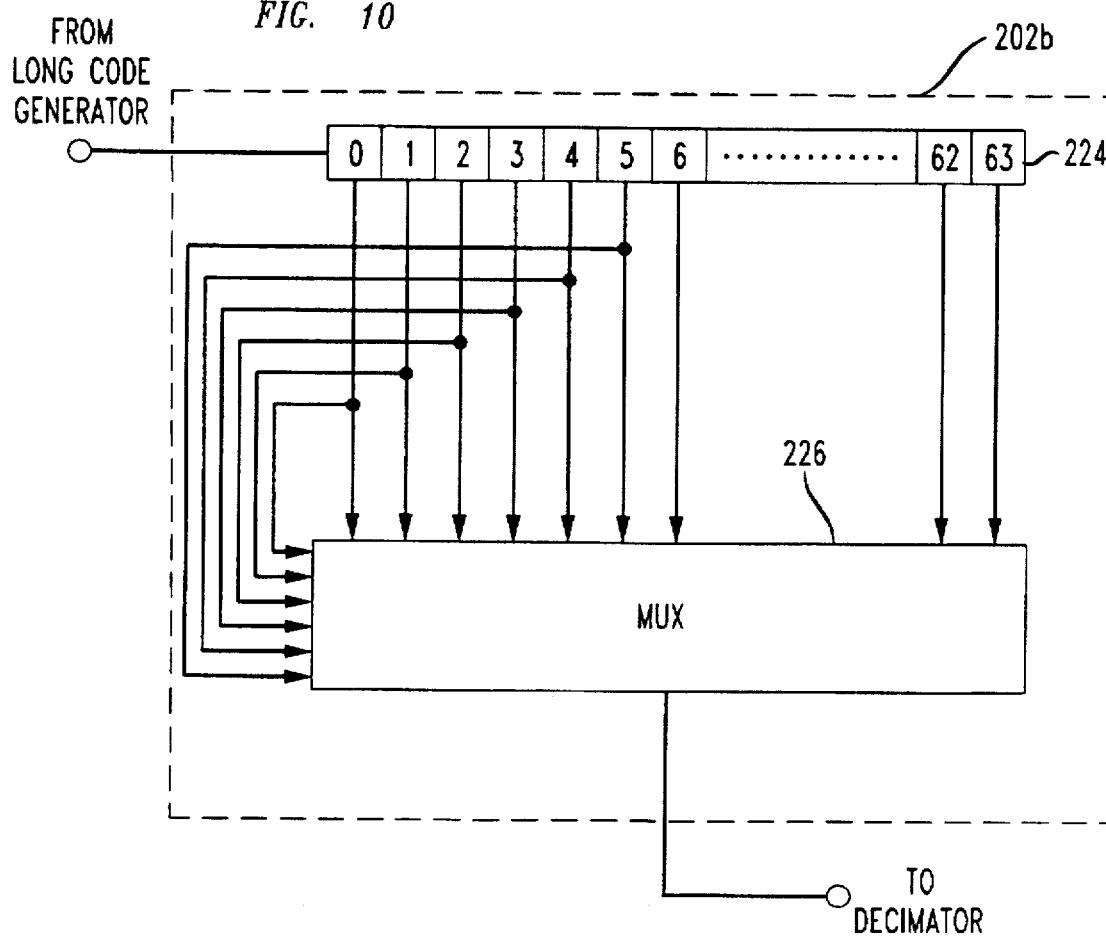
FIG. 10 is another embodiment of a nonlinear scrambler for use in the encryptor of FIG. 7 and the decryptor of FIG. 8.

FIG. 10 illustrates another embodiment of a nonlinear scrambler indicated generally at 202b constructed according to the teachings of the present invention. Scrambler 202b comprises a shift register 224 having 64 cells. Each cell of shift register 224 is coupled to an input of a multiplexer 226. Additionally, the cells labeled 0 through 5 of shift register 224 are coupled to selector inputs of multiplexer 226. It is noted that any six of the cells of shift register 224 could be used as the selector inputs for multiplexer 226.

In operation, the bits of the long code sequence shift through shift register 224. The values in cells 0 through 5 of shift register 224 select one of the cells from shift register 224 to be passed as an output bit by multiplexer 226 to decimator 204.

Figure 11:
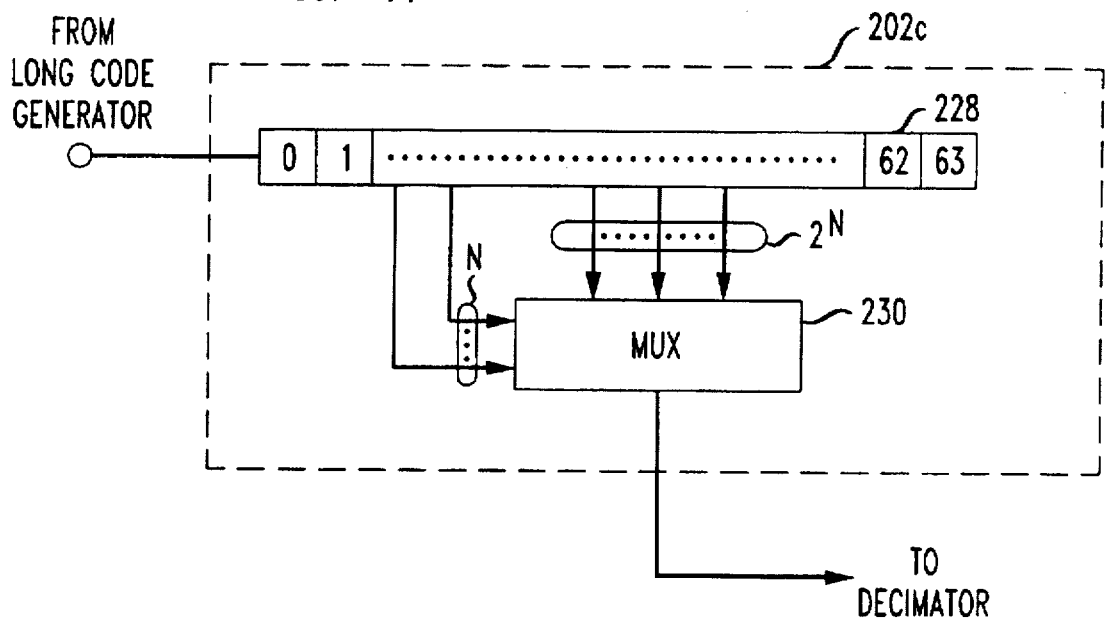
FIG. 11 is another embodiment of a nonlinear scrambler for use in the encryptor of FIG. 7 and the decryptor of FIG. 8.

FIG. 11 illustrates another embodiment of a nonlinear scrambler indicated generally at 202c and constructed according to the teachings of the present invention. Scrambler 202c comprises a shift register 228 having 64 cells. N selected cells of shift register 228 are coupled to selector inputs of multiplexer 230. Additionally, $2^N$ selected cells of shift register 228 are also coupled as inputs of multiplexer 230.

In operation, the bits of the long code sequence shift through shift register 228. Multiplexer 230 selects a cell of shift register 228 based on the selector inputs from shift register 228. The value of the selected cell is passed as the output of scrambler 202c to decimator 204.

Figure 12:
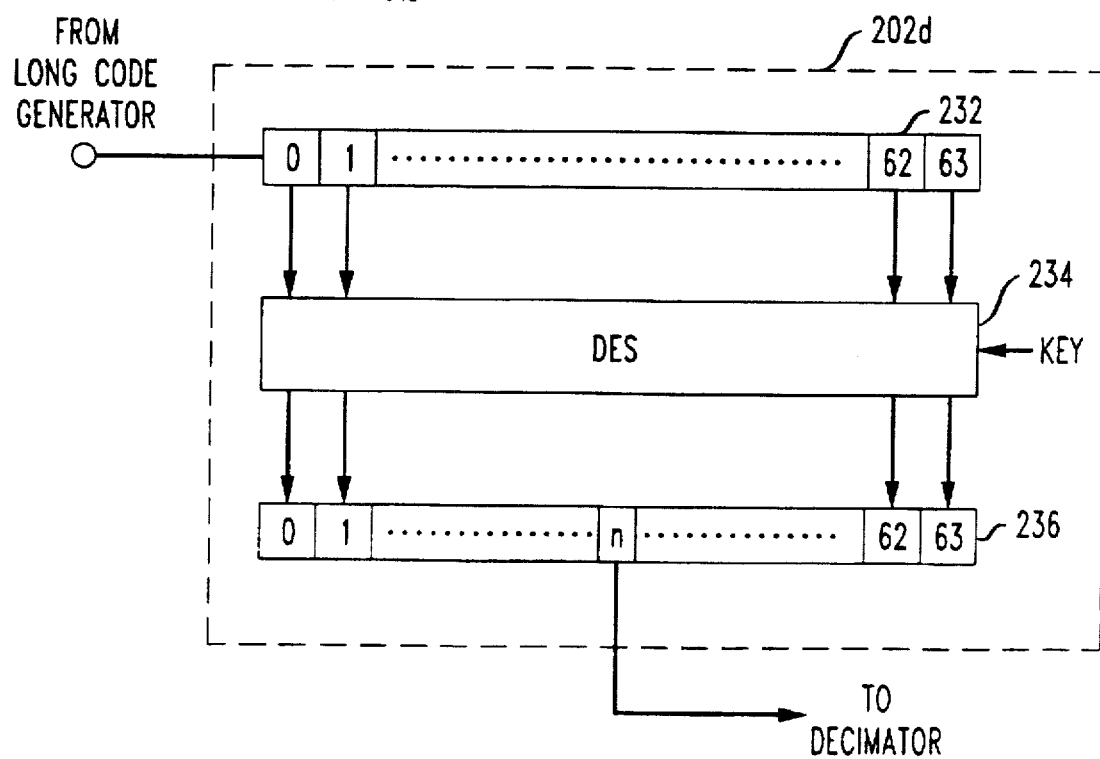
FIG. 12 is another embodiment of a nonlinear scrambler for use in the encryptor of FIG. 7 and the decryptor of FIG. 8.

FIG. 12 illustrates another embodiment of a nonlinear scrambler indicated generally at 202d constructed according to the teachings of the present invention. Scrambler 202d comprises a shift register 232 having 64 cells. Each cell of shift register 232 is coupled to an input of a data encryption standard (DES) circuit 234. DES circuit 234 encrypts data according to Federal Information Processing Standards Publication 46 dated Jan. 15, 1977. A private key signal is provided to DES circuit 234. DES circuit 234 comprises 64 outputs that are coupled to a register 236. A selected cell of register 236 is provided as an output for scrambling circuit 202d.

In operation, the bits of the long code sequence shift through shift register 232. DES circuit 234 encrypts the data in shift register 232 using the key signal and conventional DES techniques. DES circuit 234 provides an encrypted version of the data in shift register 232 to register 236. Scrambler 202d provides an output signal from register 236 to decimator 204.

Figure 13:
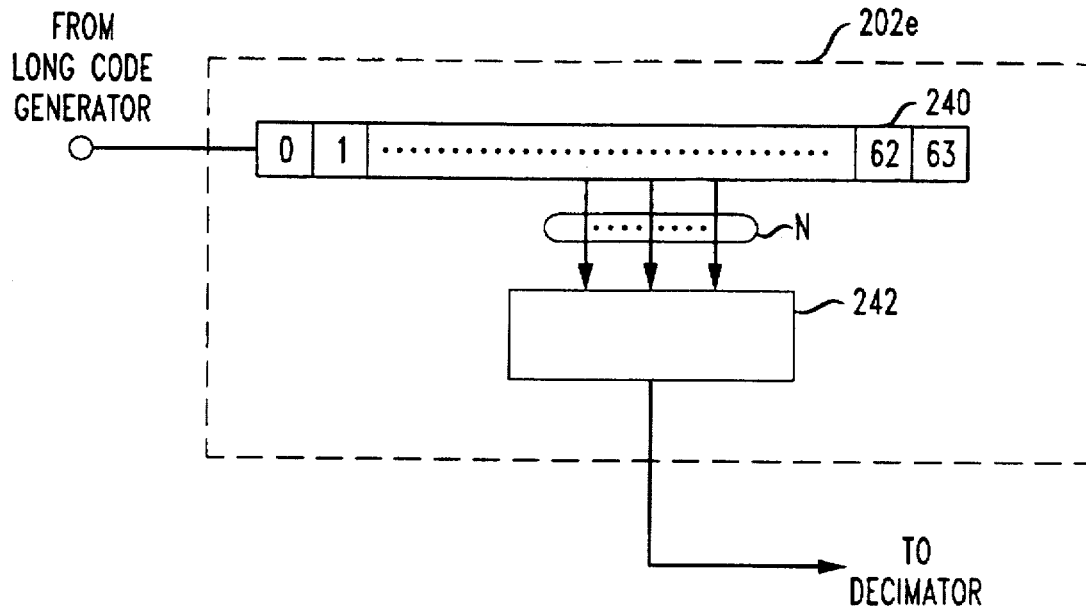
FIG. 13 is another embodiment of a nonlinear scrambler for use in the encryptor of FIG. 7 and the decryptor of FIG. 8.

FIG. 13 illustrates another embodiment of a nonlinear scrambler indicated generally at 202e and constructed according to the teachings of the present invention. Scrambler 202e comprises a shift register 240 having 64 cells. N selected cells of shift register 240 are coupled to inputs of a nonlinear function 242. For example, nonlinear function 242 may comprise a two input AND-gate or other appropriate function for creating a nonlinear output.

In operation, the bits of the long code sequence shift through shift register 240. Nonlinear function 242 generates an output signal based on the values of the N input cells of shift register 240.

Figure 14:
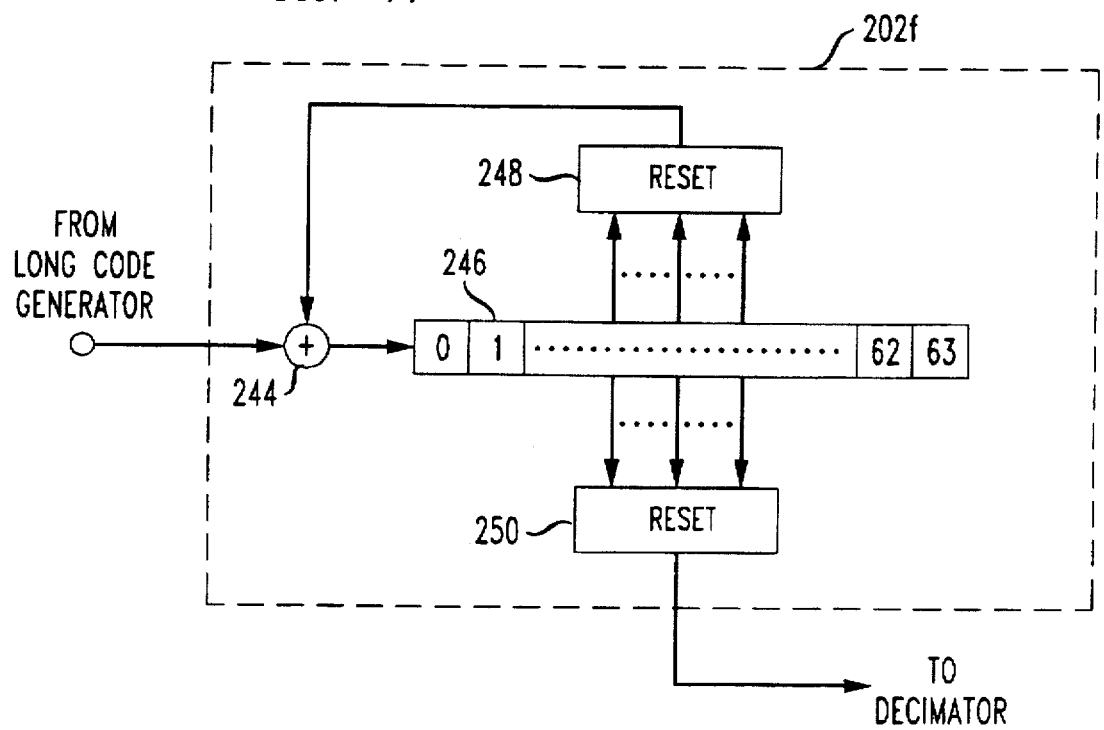
FIG. 14 is another embodiment of a nonlinear scrambler for use in the encryptor of FIG. 7 and the decryptor of FIG. 8.

FIG. 14 is another embodiment of a nonlinear scrambler indicated generally at 202f and constructed according to the teachings of the present invention. Scrambler 202f comprises an Exclusive-OR gate 244, a shift register 246, a first logic circuit 248 and a second logic circuit 250. The output of long code generator 200 and the output of first logic circuit 248 are coupled to the inputs of Exclusive-OR gate 244. Exclusive-OR gate 244 is coupled to shift register 246. First logic circuit 248 taps two or more cells of shift register 246. Finally, second logic circuit 250 taps a second selected set of cells of shift register 246. Second logic circuit 250 comprises the output of scrambler 202f. A reset signal is also provided to clear shift registers 248 and 250.

In operation, scrambler 202f outputs a sequence of bits that are a nonlinear combination of the bits of the long code sequence by use of a feedback loop. Exclusive-OR gate 244 outputs bits to shift register 246. The bits shift through shift register 246 and are selectively combined in first logic circuit 248. First logic circuit 248 may comprise a simple AND-gate. Alternatively, first logic circuit 248 may comprise a more complicated combinational logic circuit. First logic circuit 248 provides a second input to Exclusive-OR gate 244 such that the bits entering shift register 246 ultimately depend on the current bit of the long code sequence and a logical combination of prior bits output by Exclusive-OR gate 244. Second logic circuit 250 combines bits from selected cells of register 246 as output for scrambler 202f.

Figure 15:
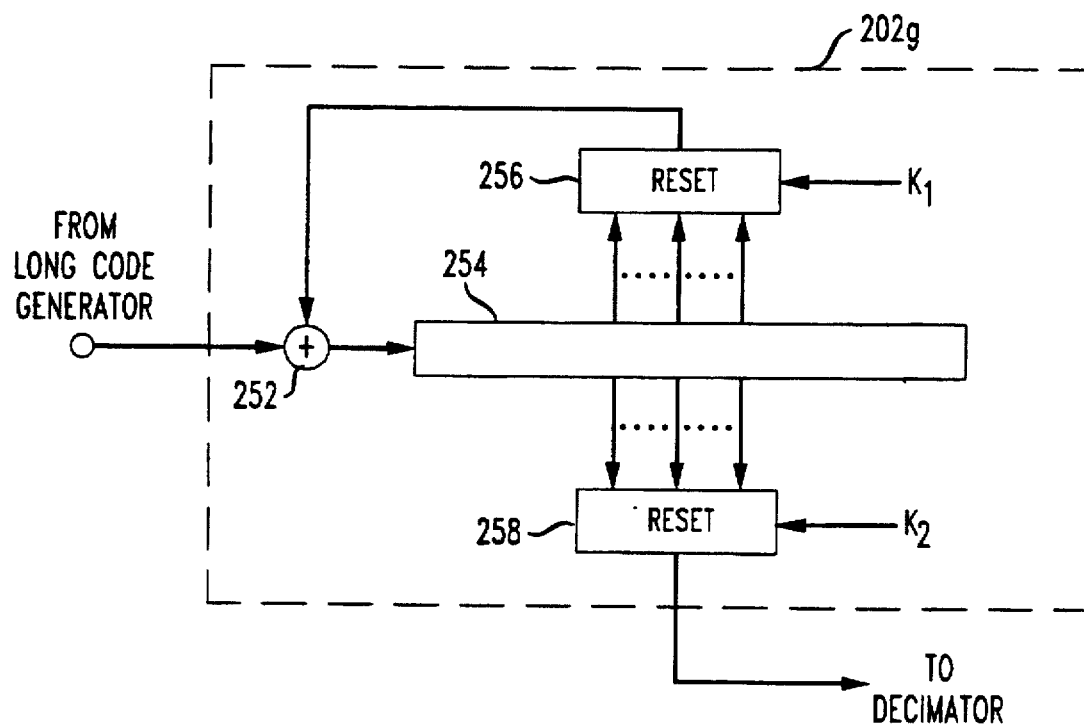
FIG. 15 is another embodiment of a nonlinear scrambler for use in the encryptor of FIG. 7 and the decryptor of FIG. 8.

FIG. 15 is another embodiment of a nonlinear scrambler indicated generally at 202g and constructed according to the teachings of the present invention. Scrambler 202g comprises an Exclusive-OR gate 252, a shift register 254, a first logic circuit 256 and a second logic circuit 258. The output of long code generator 200 and the output of first logic circuit 256 are coupled to the inputs of Exclusive-OR gate 252. Exclusive-OR gate 252 is coupled to shift register 254. First logic circuit 256 taps one or more cells of shift register 256. Additionally, a private key signal $K_1$ may be provided to first logic circuit 256 for use in creating the encryption signal. Second logic circuit 258 taps a second selected set of cells of shift register 254. A second private key $K_2$ may be provided to second logic circuit 258 for use in creating the encryption signal. Second logic circuit 258 comprises the output of scrambler 202g. A reset signal is also provided to clear shift registers 256 and 258.

In operation, scrambler 202g outputs a sequence of bits that have a nonlinear dependence on a private sequence of bits. The private sequence of bits can be the long code mask as processed by long code generator 202, signal $K_1$ or $K_2$, or any appropriate combination thereof. Exclusive-OR gate 252 outputs bits to shift register 254. The bits shift through shift register 254 and are selectively combined with bits of signal $K_1$ in first logic circuit 256. First logic circuit 248 may comprise a simple and-gate. Alternatively, first logic circuit 256 may comprise a more complicated combinational logic circuit. First logic circuit 256 provides a second input to Exclusive-OR gate 252 such that the bits entering shift register 254 ultimately depend on the current bit of the long code sequence and a logical combination of prior bits output by Exclusive-OR gate 252 and the signal $K_1$. Second logic circuit 258 combines bits from selected cells of register 254 with bits of signal $K_2$ as output for scrambler 202f.

It is noted that nonlinear scrambler 202g can achieve increased privacy over conventional systems without use of long code generator 200. If long code generator 200 is omitted from encryptor 130, either $K_1$, $K_2$ or both must be private to increase privacy. Additionally, if either $K_1$, $K_2$ or both are private, long code generator 200 could create a long code sequence from a public long code mask M. It is also noted that either $K_1$ or $K_2$ may be omitted without departing from the teachings of the present invention.

Figure 16:
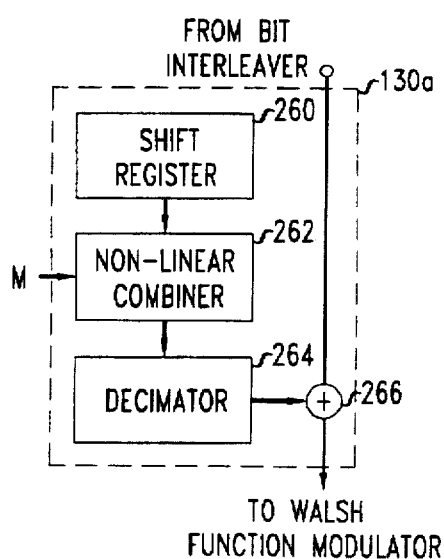
FIG. 16 is another embodiment of an encryptor for use in the base station of FIG. 5.

FIG. 16 is another embodiment of an encryptor indicated generally at 130a for use in the base station 112 of FIG. 5.

Encryptor 130a generates a key signal with the series combination of a shift register 260 and, a nonlinear combiner 262 and a decimator 264. The output of decimator 264 is coupled to a first input of a modulo-2 adder 266. The second input of adder 266 is coupled to bit interleaver 134. A private long code mask, M, is provided to nonlinear combiner 262.

In operation, encryptor 130a generates a key signal with bits that are a nonlinear combination of the bits of the long code mask. Shift register 260 generates a sequence of bits from a publicly known quantity. Nonlinear combiner 262 combines the long code mask M with the output of shift register 260. Decimator 264 selects bits output from nonlinear combiner 262 with a known frequency. For example, decimator 264 may output 1 in 64 of the bits output by nonlinear combiner 262. Adder 266 adds (modulo-2) the signal from bit interleaver 134 with the signal from decimator 264.

Figure 17:
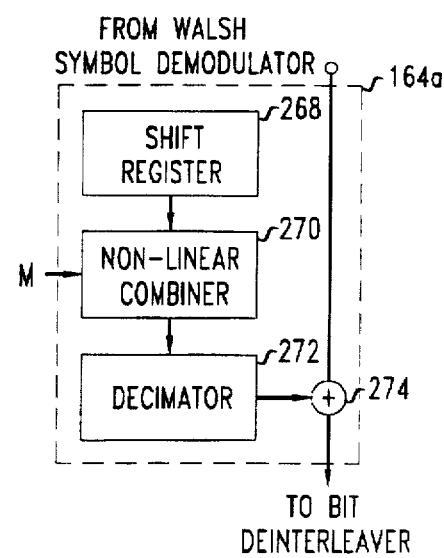
FIG. 17 is another embodiment of a decryptor for use in the wireless terminal of FIG. 6.

FIG. 17 is another embodiment of a decryptor indicated generally at 164a for use in the wireless terminal 124 of FIG. 6. Decryptor 164a generates a key signal with the series combination of a shift register 268, a nonlinear combiner 270 and a decimator 272. The output of decimator 272 is coupled to a first input of a modulo-2 adder 274. The second input of adder 274 is coupled to Walsh symbol demodulator 154. A private long code mask, M, is provided to nonlinear combiner 270.

In operation, decryptor 164a generates a key signal with bits that are a nonlinear combination of the bits of the long code mask. Shift register 268 generates a sequence of bits from a publicly known quantity. Nonlinear combiner 270 combines the long code mask M with the output of shift register 268. Decimator 272 selects bits output from nonlinear combiner 270 with a known frequency. For example, decimator 272 may output 1 in 64 of the bits output by nonlinear combiner 270. Adder 274 adds (modulo-2) the signal from Walsh symbol modulator 154 with the signal from decimator 272.

Although the present invention has been described in detail, it should be understood that various alterations, substitutions and changes can be made hereto without departing from the spirit and scope of the invention as defined by the appended claims. For example, the shift registers shown in FIGS. 9 through 15 are not limited to 64 cells. The number of cells may be varied without departing from the teachings of the present invention. The 64 cell registers are simply shown by way of example and not by way of limitation. Furthermore, the encryptors and decryptors described herein can be used without decimators. Alternatively, the function of decimator can be partially or fully incorporated into other circuitry.

Scramblers 202a through 202g each includes one or more shift registers. It is emphasized that these shift registers are shown by way of example and not by way of limitation. The shift registers store input bits provided to the scrambler for use in creating subsequent output bits. To this end, the shift registers in FIGS. 9 through 15 can be replaced with any appropriate circuit for performing this same function.

To ensure that the nonlinear scramblers constructed according to the teachings of the present invention in the base station and in the wireless terminal produce identical outputs when fed with identical long code sequence inputs during a transmission, the scramblers should start with the same internal state. Thus, any shift registers in the scramblers must start with identical contents. One means for accomplishing this is to reset any such shift registers with fixed initial values in response to a reset signal during the time of hand-off. The reset signals shown in FIGS. 9, 14 and 15 can be used to implement this feature. The registers may also be reset, for example, such as at the beginning of each new frame.

It is noted that the Exclusive-OR gates specified in FIGS. 9, 14 and 15 can be implemented with any appropriate function that performs modulo-2 addition.

It is also noted that the number of bits in the long code mask may be varied from 42 without departing from the spirit and scope of the teachings of the present invention.

We claim:

1. A base station in a spectrum wireless communications system, comprising:
   an RF antenna;
   a reverse channel that receives and processes a signal from a wireless terminal; and
   a forward channel that transmits an input signal from a mobile switching center to a wireless terminal, said forward channel circuit comprising:
      a channel coder responsive to said mobile switching center that error correction codes said input signal,
      a bit interleaver responsive to said channel coder that rearranges the order of the bits in the input signal so as to minimize the effect of error bursts,
      an encryptor responsive to said channel coder that encrypts said input signal, said encryptor including a nonlinear scrambler for generating a key signal comprising a sequence of bits that have a nonlinear relationship to a private long code mask, and
      circuitry responsive to said channel coder, said bit interleaver and said encryptor and coupled to said antenna for modulating and transmitting said input signal.

2. The base station of claim 1, wherein said encryptor comprises:
   a long code generator that creates a long code sequence from a long code mask;
   a nonlinear scrambler responsive to said long code generator that creates a key signal that is a nonlinear function of the bits of the long code mask; and
   a circuit responsive to said bit interleaver and said nonlinear scrambler that encrypts said input signal.

3. The base station of claim 2, wherein said non-linear scrambler comprises:
   a shift register having a first predetermined number of cells, said shift register having an input to receive a stream of input bits from said long code register;
   a first logic circuit coupled to said shift register so as to access the contents of selected cells, said first logic circuit having an output;
   a second logic circuit having first and second inputs and an output, said first input coupled to said long code generator, said second input coupled to said output of said first logic circuit, and said output coupled to said input of said shift register so as to provide a feedback loop for said nonlinear scrambler, said output of said second logic circuit also comprising the output of said nonlinear scrambler.

4. The base station of claim 3, wherein said second logic circuit comprises an Exclusive-OR gate.

5. The base station of claim 2, wherein said nonlinear scrambler includes a feedback loop.

6. The base station of claim 2 wherein said nonlinear scrambler comprises a feedback loop such that an output bit of said nonlinear scrambler is used to create a subsequent output bit.

7. The base station of claim 2, wherein said nonlinear scrambler comprises:
   a shift register having a predetermined number of cells, said shift register having an input to receive a stream of input bits from said long code generator; and
   a combinational logic circuit coupled to tap the contents of selected cells of said shift register so as to provide an output for said nonlinear scrambler.

8. The base station of claim 7, wherein said combinational logic circuit comprises an AND-gate having at least two inputs coupled to selected cells of said shift register.

9. The base station of claim 2, wherein said nonlinear scrambler comprises:
   a shift register having a predetermined number of cells, said shift register having an input to receive a stream of input bits from said long code generator; and
   a multiplexer having a predetermined number of data inputs and a predetermined number of selector inputs, said selector inputs coupled to a first set of selected cells of said shift register and said data inputs coupled to a second selected set of cells of said shift register such that the first set of cells selects among the second set of cells to provide an output from said multiplexer.

10. The base station of claim 9, wherein said first and second sets of cells are mutually exclusive.

11. The base station of claim 9, wherein said first and second sets of cells share a predetermined number of cells.

12. The base station of claim 2, wherein said nonlinear scrambler comprises:
   a shift register having a predetermined number of cells, said shift register having an input to receive a stream of input bits from said long code generator;
   a data encryption standard circuit having a predetermined number of inputs coupled to selected cells of said shift register for using a key signal to create an encrypted output bit for each input; and
   a register having a predetermined number of cells, each cell coupled to receive a bit output by said data encryption standard circuit, a selected cell of said register providing the output of said nonlinear scrambling register.

13. The base station of claim 2, wherein said nonlinear scrambler comprises:
   a feedback circuit responsive to said long code generator, said feedback circuit including a shift register; and
   a combinational logic circuit coupled to tap selected cells of said shift register so as to generate an output for said nonlinear scrambler.

14. An encryptor for encrypting an input signal in a forward channel of a spread spectrum wireless communication system, said encryptor comprising:
   a long code generator that creams a long code sequence from a long code mask;
   a nonlinear scrambler responsive to said long code generator that creates a key signal that is a nonlinear function of the bits of the long code mask; and
   a combinational logic circuit that encrypts said input signal with said key signal.

15. The encryptor of claim 14, wherein said non-linear scrambling circuit comprises:
   a shift register having a first predetermined number of cells, said shift register having an input to receive a stream of input bits from said long code register;
   a first logic circuit coupled to said shift register so as to access the contents of predetermined cells, said first logic circuit having an output;
   a second logic circuit having first and second inputs and an output, said first input coupled to said long code generator, said second input coupled to said output of said first logic circuit, and said output coupled to said input of said shift register so as to provide a feedback loop for said nonlinear scrambler, said output of said second logic circuit also comprising the output of said nonlinear scrambler.

16. The encryptor of claim 15, wherein said second logic circuit comprises an Exclusive-OR gate.

17. The encryptor of claim 14, wherein said nonlinear scrambler comprises a feedback loop such that an output bit of said nonlinear scrambler is used to create a subsequent output bit.

18. The encryptor of claim 14, wherein said nonlinear scrambler comprises:
   a shift register having a predetermined number of cells, said shift register having an input to receive a stream of input bits from said long code generator; and
   a combinational logic circuit coupled to tap the contents of a predetermined number of said cells of said shift register so as to provide an output of said nonlinear scrambler.

19. The encryptor of claim 18, wherein said combinational logic circuit comprises an AND-gate having at least two inputs coupled to selected cells of said shift register.

20. The encryptor of claim 14, wherein said nonlinear scrambler comprises:
   a shift register having a predetermined number of cells, said shift register having an input to receive a stream of input bits from said long code generator; and
   a multiplexer having a predetermined number of data inputs and a predetermined number of selector inputs, said selector inputs coupled to a first set of selected cells of said shift register and said data inputs coupled to a second selected set of cells of said shift register such that the first set of cells selects among the second set of cells to provide an output from said multiplexer.

21. The base station of claim 20, wherein said first and second sets of cells are mutually exclusive.

22. The base station of claim 20, wherein said first and second sets of cells share a predetermined number of cells.

23. The base station of claim 14, wherein said nonlinear scrambler comprises:
   a shift register having a predetermined number of cells, said shift register having an input to receive a stream of input bits from said long code generator;
   a data encryption standard circuit having a predetermined number of inputs coupled to selected cells of said shift register for using a key signal to create an encrypted output bit for each input; and
   a register having a predetermined number of cells, each cell coupled to receive a bit output by said data encryption standard circuit, a selected cell of said register providing the output of said nonlinear scrambling register.

24. A wireless terminal for a spread spectrum wireless communication system, comprising;
   an RF antenna;
   a reverse channel circuit that processes and transmits a signal to a base station; and
   a forward channel circuit that receives and processes a transmitted signal from a base station, said forward channel circuit comprising:
      a receiver circuit coupled to said antenna that demodulates said transmitted signal, a decryptor responsive to said receiver circuit that decrypts said transmitted signal, said decryptor including a nonlinear scrambler for generating a key signal comprising a sequence of bits that have a nonlinear relationship to a private long code mask, a bit deinterleaver responsive to said receiver circuit that rearranges the order of the bits in the transmitted signal, a channel decoder responsive to said receiver circuit that utilizes error correction coding of said transmitted signal to provide error correction, a voice decoder responsive to said receiver circuit that generates an output signal from said transmitted signal, and an output device for outputting the transmitted signal.

25. The wireless terminal of claim 24, wherein said decryptor comprises:

a long code generator that creates a long code sequence from a long code mask;

a nonlinear scrambler responsive to said long code generator that creates an key signal that is a nonlinear function of the bits of the long code mask; and a combinational logic circuit responsive to said nonlinear scrambler and said receiver circuit that decrypts said transmitted signal.

26. The wireless terminal of claim 25, wherein said non-linear scrambling circuit comprises:

a shift register having a first predetermined number of cells, said shift register having an input to receive a stream of input bits from said long code register;

a first logic circuit coupled to said shift register so as to access the contents of selected cells, said first logic circuit having an output;

a second logic circuit having first and second inputs and an output, said first input coupled to said long code generator, said second input coupled to said output of said first logic circuit, and said output coupled to said input of said shift register so as to provide a feedback loop for said nonlinear scrambler, said output of said second logic circuit also comprising the output of said nonlinear scrambler.

27. The wireless terminal of claim 26, wherein said second logic circuit comprises an Exclusive-OR gate.

28. The wireless terminal of claim 25, wherein said nonlinear scrambler includes a feedback loop.

29. The wireless terminal of claim 25 wherein said nonlinear scrambler comprises a feedback loop such that an output bit of said nonlinear scrambler is used to create a subsequent output bit.

30. The wireless terminal of claim 25, wherein said nonlinear scrambler comprises:

a shift register having a predetermined number of cells, said shift register having an input to receive a stream of input bits from said long code generator; and a combinational logic circuit coupled to tap the contents of selected cells of said shift register so as to provide an output of said nonlinear scrambler.

31. The wireless terminal of claim 30, wherein said combinational logic circuit comprises an AND-gate having at least two inputs coupled to selected cells of said shift register.

32. The wireless terminal of claim 25, wherein said nonlinear scrambler comprises:

a shift register having a predetermined number of cells, said shift register having an input to receive a stream of input bits from said long code generator; and a multiplexer having a predetermined number of data inputs and a predetermined number of selector inputs, said selector inputs coupled to a first set of selected cells of said shift register and said data inputs coupled to a second selected set of cells of said shift register such that the first set of cells selects among the second set of cells to provide an output from said multiplexer.

33. The wireless terminal of claim 32, wherein said first and second sets of cells are mutually exclusive.

34. The wireless terminal of claim 32, wherein said first and second sets of cells share a predetermined number of cells.

35. The wireless terminal of claim 25, wherein said nonlinear scrambler comprises:

a shift register having a predetermined number of cells, said shift register having an input to receive a stream of input bits from said long code generator;

a data encryption standard circuit having a predetermined number of inputs coupled to selected cells of said shift register for using a key signal to create an encrypted output bit for each input; and a register having a predetermined number of cells, each cell coupled to receive a bit output by said data encryption standard circuit, a selected cell of said register providing the output of said nonlinear scrambling register.

36. The wireless terminal of claim 25, wherein said nonlinear scrambler comprises:

a feedback circuit responsive to said long code generator, said feedback circuit including a shift register; and a combinational logic circuit coupled to tap selected cells of said shift register so as to generate an output for said nonlinear scrambler.

37. A method for preventing interception of an information signal from a spread spectrum base station to a wireless terminal in a wireless communications system, said method comprising the steps of:

receiving an input signal from a mobile switching center;

coding said input signal with a channel coder to provide error correction coding of said input signal;

interleaving the bits of said input signal with a bit interleaver so as to minimize the effect of error bursts;

generating a key signal with an encryptor including a nonlinear scrambler such that the bits of the key signal comprise a sequence of bits that have a nonlinear relationship to a private long code mask;

encrypting said input signal with said key signal; modulating said input signal for transmission; and transmitting said input signal.

38. The method of claim 37 wherein said step of generating a key signal comprises the steps of:

generating a long code sequence from a long code mask in a long code generator; and scrambling said long code sequence in a nonlinear scrambler.

39. The method of claim 38 wherein said step of scrambling the long code sequence comprises the step of scrambling the long code sequence in a nonlinear scrambler having a feedback loop.

40. The method of claim 38 wherein said step of scrambling the long code sequence comprises the step of scrambling the long code sequence in a nonlinear scrambler having a shift register coupled to receive the long code sequence and a combinational logic circuit coupled to selected cells of the shift register to generate the output of the nonlinear scrambler.

41. The method of claim 38 wherein said step of scrambling the long code sequence comprises the steps of:

shifting the bits of the long code sequence through a shift register having a predetermined number of cells; and using selected cells of said shift register to select among the cells of the shift register to provide an output of said nonlinear scrambler.

42. The method of claim 38 wherein said step of scrambling the long code sequence comprises the steps of:

shifting the bits of the long code sequence through a shift register having a predetermined number of cells; and encrypting the bits in said shift register with a data encryption standard circuit and a second key signal.

43. A spread spectrum wireless infrastructure, comprising:

a mobile switching center coupled to receive input signals from at least one local office and at least one toll office;

a plurality of base stations coupled to said mobile switching center, each base station comprising:

an RF antenna;

a reverse channel that receives and processes a signal from a wireless terminal; and a forward channel that transmits an input signal from one of said mobile switching centers to a wireless terminal, said forward channel circuit comprising:

a channel coder responsive to said mobile switching center that error correction codes said input signal, a bit interleaver responsive to said channel coder that rearranges the order of the bits in the input signal so as to minimize the effect of error bursts, an encryptor responsive to said channel coder that encrypts said input signal, said encryptor including a nonlinear scrambler for generating a key signal comprising a sequence of bits that have a nonlinear relationship to a private long code mask, and circuitry responsive to said channel coder and coupled to said antenna that modulates said input signal.

44. The wireless infrastructure of claim 43, wherein said encryptor comprises:

a long code generator for creating a long code sequence from a long code mask;

a nonlinear scrambler responsive to said long code generator for creating a key signal that is a nonlinear function of the bits of the long code mask; and a combinational logic circuit responsive to said bit interleaver for encrypting said input signal.

45. The wireless infrastructure of claim 44, wherein said non-linear scrambler comprises:

a shift register having a first predetermined number of cells, said shift register having an input to receive a stream of input bits from said long code register;

a first logic circuit coupled to said shift register so as to access the contents of selected cells, said first logic circuit having an output;

a second logic circuit having first and second inputs and an output, said first input coupled to said long code generator, said second input coupled to said output of said first logic circuit, and said output coupled to said input of said shift register so as to provide a feedback loop for said nonlinear scrambler, said output of said second logic circuit also comprising the output of said nonlinear scrambler.

46. The wireless infrastructure of claim 45, wherein said second logic circuit comprises an Exclusive-OR gate.

47. The wireless infrastructure of claim 44, wherein said nonlinear scrambler includes a feedback loop.

48. The wireless infrastructure of claim 44 wherein said nonlinear scrambler comprises a feedback loop such that an output bit of said nonlinear scrambler is used to create a subsequent output bit.

49. The wireless infrastructure of claim 44, wherein said nonlinear scrambler comprises:

a shift register having a predetermined number of cells, said shift register having an input to receive a stream of input bits from said long code generator; and a combinational logic circuit coupled to tap the contents of selected cells of said shift register so as to provide an output of said nonlinear scrambler.

50. The wireless infrastructure of claim 49, wherein said combinational logic circuit comprises an AND-gate having at least two inputs coupled to selected cells of said shift register.

51. The wireless infrastructure of claim 44, wherein said nonlinear scrambler comprises:

a shift register having a predetermined number of cells, said shift register having an input to receive a stream of input bits from said long code generator; and a multiplexer having a predetermined number of data inputs and a predetermined number of selector inputs, said selector inputs coupled to a first set of selected cells of said shift register and said data inputs coupled to a second selected set of cells of said shift register such that the first set of cells selects among the second set of cells to provide an output from said multiplexer.

52. The wireless infrastructure of claim 51, wherein said first and second sets of cells are mutually exclusive.

53. The wireless infrastructure of claim 51, wherein said first and second sets of cells share a predetermined number of cells.

54. The wireless infrastructure of claim 44, wherein said nonlinear scrambler comprises:

a shift register having a predetermined number of cells, said shift register having an input to receive a stream of input bits from said long code generator;

a data encryption standard circuit having a predetermined number of inputs coupled to selected cells of said shift register for using a key signal to create an encrypted output bit for each input; and a register having a predetermined number of cells, each cell coupled to receive a bit output by said data encryption standard circuit, a selected cell of said register providing the output of said nonlinear scrambling register.

55. The wireless infrastructure of claim 44, wherein said nonlinear scrambler comprises:

a feedback circuit responsive to said long code generator, said feedback circuit including a shift register; and a combinational logic circuit coupled to tap selected cells of said shift register so as to generate an output for said nonlinear scrambler.

* * * * *